(12) United States Patent
Shimizu et al.

(10) Patent No.: US 7,361,015 B2
(45) Date of Patent: Apr. 22, 2008

(54) CLAMP DEVICE AND CLAMP METHOD FOR HEAT-TREATED ARTICLE

(75) Inventors: Satoshi Shimizu, Hamura (JP); Norihiko Kikuchi, Hamura (JP); Tatsushi Yurudume, Hamura (JP); Hisao Hoshino, Hamura (JP); Takao Minagawa, Hamura (JP); Hiroyuki Osaka, Hamura (JP); Makoto Noudou, Hamura (JP); Shigeki Kishihara, Kawasaki (JP); Shingo Shikuwa, Kawasaki (JP)

(73) Assignee: Kikuchi Co., Ltd., Hamura-shi, Tokyo (JP)

( * ) Notice: Subject to any disclaimer, the term of this patent is extended or adjusted under 35 U.S.C. 154(b) by 179 days.

(21) Appl. No.: 10/541,331

(22) PCT Filed: Oct. 4, 2004

(86) PCT No.: PCT/JP2004/014588

§ 371 (c)(1),
(2), (4) Date: Jul. 1, 2005

(87) PCT Pub. No.: WO2005/033345

PCT Pub. Date: Apr. 14, 2005

(65) Prior Publication Data

US 2006/0082040 A1 Apr. 20, 2006

(30) Foreign Application Priority Data

Oct. 6, 2003 (JP) ............................. 2003-346522
Jan. 22, 2004 (JP) ............................. 2004-014140

(51) Int. Cl.
*F27D 5/00* (2006.01)
(52) U.S. Cl. ................... 432/231; 266/274; 148/646
(58) Field of Classification Search ............... 432/231, 432/253, 258; 266/274; 148/646
See application file for complete search history.

(56) References Cited

U.S. PATENT DOCUMENTS 2,867,556 A * 1/1959 Tegen ....................... 148/581

(Continued)

FOREIGN PATENT DOCUMENTS

JP 2-114115 U 9/1990

(Continued)

OTHER PUBLICATIONS

Shibata, M., et al., "A Method to Induction-harden Sheet Steel Parts of Automotive Body for Achieving Occupant Safety in Collision, Weight Reduction, and Cost Saving", *Materia Japan*, vol. 37, No. 6 (1998), 14 pages, including English translation.

(Continued)

*Primary Examiner*—Gregory A. Wilson
(74) *Attorney, Agent, or Firm*—Flynn, Thiel, Boutell & Tanis, P.C.

(57) ABSTRACT

A heat treatment operation can be executed, suppressing a wave-shaped deformation at a non heat-treatment region of an article to be heat treated.

To an elongated-shaped article to be heat treated to which a raised portion extending in the longitudinal direction is formed, a hardening region, as a heat-treated region defined to extend in a longitudinal direction at a part of the raised portion, and a non-hardening region, as a non-heat-treated region defined to extend in the longitudinal direction at flange portion, and other parts of the raised portion are arranged side by side in a width direction orthogonal to the longitudinal direction. The flange portion is clamped by a first and a second clamp, arranged in the longitudinal direction, and one first clamp is a tight clamp for holding fixedly the flange portion and a plurality of second clamps are loose clamps for clamping loosely the flange portion, allowing the article to be heat treated to be convex on the side of the heated hardening region.

11 Claims, 21 Drawing Sheets

U.S. PATENT DOCUMENTS

| | | | |
|---|---|---|---|
| 3,568,490 A * | 3/1971 | Bohmann | 72/302 |
| 6,090,330 A * | 7/2000 | Gawa et al. | 264/400 |
| 6,601,426 B2 * | 8/2003 | Wegener | 72/294 |
| 6,918,224 B2 * | 7/2005 | Tjoelker et al. | 52/745.19 |
| 2004/0113461 A1 | 6/2004 | Shimizu et al. | |
| 2004/0169321 A1 | 9/2004 | Tanaka et al. | |

FOREIGN PATENT DOCUMENTS

| | | |
|---|---|---|
| JP | 10-17933 A | 1/1998 |
| JP | 2000-256733 A | 9/2000 |
| JP | 2002-282950 A | 10/2002 |
| JP | 2003-160062 A | 6/2003 |
| JP | 2003-239018 A | 8/2003 |
| WO | WO 02/079525 A1 | 10/2002 |

OTHER PUBLICATIONS

Shibata, M., et al., "Method of Improving Side Impact Protection Performance by Induction Hardening of Body Reinforcement", *SAE Technical Paper Series*, No. 980550, 1998, 15 pages.

\* cited by examiner

US 7,361,015 B2

CLAMP DEVICE AND CLAMP METHOD FOR HEAT-TREATED ARTICLE

TECHNICAL FIELD

This invention relates to a clamping device for an article to be heat treated, and a clamping method thereof, for clamping the article to be heat treated on the occasion of having heat treatment operations, such as a hardening, in which a heating and a subsequent quenching are performed, for example, applicable when an elongated-shaped article to be heat treated, made of a sheet material, is hardened by an induction heating method and the like.

BACKGROUND ART

A reinforcing member for securing a large strength against a side collision is provided to a center pillar of a four-wheeled vehicle. The elongated-shaped reinforcing member, being a press-formed article made of a steel sheet, includes a three-dimensional shape having a raised portion which is raised in the middle of the width direction orthogonal to a longitudinal direction, as well as includes two flange portions extending outward in the width direction of the raised portion from raised portion base ends on both sides across the width in the raised portion. The hardening operations for strengthening partially the reinforcing member for the center pillar are disclosed below in patent documents 1, 2 and 3. Patent documents 2 and 3 disclose that both hardening regions to be hardened by quenching after heating and non-hardening regions not to be hardened are defined to extend in a longitudinal direction of the elongated-shaped reinforcing member for the center pillar, and the hardening regions and non-hardening regions are provided side by side in the width direction orthogonal to the longitudinal direction.

Though the reinforcing member of the center pillar is clamped by a clamping device at the time of a hardening operation, the clamping device shown in patent document 2 is the device holding tightly plural places in the longitudinal direction of the reinforcing member for the center pillar in a state of fixed position at respective flange portions as being the non-hardening regions.

Patent document 1: Japanese Patent Application Laid-open No. Hei10-17933 (paragraph number 0042, FIG. 4

Patent document 2: Japanese Patent Application Laid-open No. 2000-256733 (abstract, paragraph number 0037~0040, 0044, 0045, FIGS. 1~3)

Patent document 3: Japanese Patent Application Laid-open No. 2003-160062 (abstract, FIG. 4, FIG. 8)

DISCLOSURE OF INVENTION

Problems to be Solved by the Invention

A heat treatment operation typified by a hardening operation is apt to incur thermal strain, especially when an article to be heat treated is made of a sheet material, the thermal strain is more apt to be incurred because the hardening operation is performed by quenching the article to be heat treated after it is heated to a high temperature, therefore it is required to be careful about this point.

In the case that the hardening operation is performed for the elongated-shaped article to be heat treated in which both the hardening region and the non-hardening region are defined to extend in the longitudinal direction as well as provided side by side in the width direction orthogonal to the longitudinal direction as the reinforcing member for the center pillar, the hardening region sometimes incurs a compressive yield, since the hardening region expanding thermally receives constraint about the thermal expansion by the non-hardening region when the hardening region is heated. If the compressive yield occurs, based on the decrease of length of the hardening region by the compressive yield, the hardening region incurs a tensile stress, whereas the non-hardening region incurs a compressive stress after the hardening processing by a quenching. When the compressive stress in the non-hardening region exceeds the elastic limit of the material of the article to be heat treated at a room temperature, a problem that the non-hardening region is deformed to be wave-shaped occurs.

When a clamping device for an article to be heated is constituted such that plural places of the article to be heat treated in the longitudinal direction are held tightly at the non-hardening region, as the clamping device disclosed in the patent document 2 described above, the constraint by the non-hardening region against the thermal expansion at the hardening region is strong, therefore, the hardening operation is conducted in a state that the compressive yield is apt to occur in the hardening region, as a result, it is difficult to prevent the wave-shaped deformation in the non-hardening region.

The above-described problem occurs also on the occasion that in addition to the heat treatment operations of heating or quenching, hardening such as a temper hardening and an annealing are performed.

The present invention is made by the present inventors who obtain the knowledge that the wave-shaped deformation in the non-hardening region can be suppressed by adopting measures not repressing the thermal expansion in the heat-treated region at the time of heating, or measures loosening the repression.

It is an object of the present invention to provide a clamping device for an article to be heat treated, and a clamping method thereof, in which the heat treatment operation can be performed with the wave-shaped deformation at the non heat-treated region of the article to be heat treated suppressed from occurring.

MEANS FOR SOLVING THE PROBLEMS

In a clamping device for an article to be heat treated according to the present invention for clamping the elongated-shaped article to be heat treated set in a fixed position, at a non heat-treated region on an occasion of the heat treatment operation, which is constituted such that at least one heat-treated region to be heat treated by quenching after heating and at least one non heat-treated region not to be heat treated are both defined to extend in a longitudinal direction, and the heat-treated region and the non heat-treated region are provided side by side in a width direction orthogonal to the longitudinal direction, the clamping device has plural clamping means arranged in the longitudinal direction of the article to be heat treated, and at least one clamping means, including a clamping means nearest to an end in the longitudinal direction among the plural clamping means, is a loose clamping means allowing the article to be heat treated to be convex on the side of the heat-treated region.

According to the clamping device, at least one clamping means, including a clamping means nearest to an end in a longitudinal direction among the plural clamping means arranged in the longitudinal direction of the article to be heat treated, is a loose clamping means allowing the article to be heat treated to be convex on the side of the heat-treated region, therefore, the article to be heated is allowed to be convex on the side of the heat-treated region expanding thermally when the heat-treated region is heated. Thus, thermal expansion at the heat-treated region is not repressed by the non heat-treated region or the repression is decreased. As a result, occurrence of a compressive yield at the heat-treated region is suppressed, and a wave-shaped deformation at the non heat-treated region of the article to be heat treated after the heat treatment operation can be prevented or reduced.

In the clamping device, all the plural clamping means arranged in the longitudinal direction of the article to be heat treated can be loose clamping means, or only one clamping means nearest to an end in the longitudinal direction can be a loose clamping means.

Besides, in the clamping device, the plural clamping means arranged in the longitudinal direction of the article to be heat treated can be a first clamping means and a second clamping means, and the number of the first clamping means may be one for the longitudinal direction of the article to be heat treated, and the first clamping means may be a tight clamping means holding fixedly the non heat-treated region, whereas the number of the second clamping means arranged apart from each other along the longitudinal direction of the article to be heat treated from the first clamping means may be at least one for a longitudinal direction of the article to be heat treated, and the second clamping means may be a loose clamping means.

According to the above, the heat treatment operation can be conducted in a state that the article to be heat treated is fixed in a specified position of the clamping device by the tight clamping means, as well as in a state that the article to be heat treated has not only a horizontal or a near horizontal orientation but also other orientations, for example, a vertical orientation or an inclined orientation.

The state of the article to be heat treated set in the fixed position may be the state that the article to be heat treated is set to the clamping device in the horizontal orientation or the near horizontal orientation without fixing by all clamping means as being the loose clamping means, as well as may be a state that the article to be heat treated is set to the clamping device in the horizontal orientation, the near horizontal orientation, the vertical orientation, or the inclined orientation by fixing the article to be heat treated by the first clamping means as being the tight clamping means.

It is preferable that a position where the non heat-treated region is clamped in each of said plural clamping means is adjustable in the direction orthogonal to the longitudinal direction and the width direction of the article to be heat treated.

According to the above, various kinds of articles to be heat treated having different shapes can be dealt with, and the clamping device gains versatility.

Besides, it is preferable that the size of a clearance in the loose clamping means to which the non heat-treated region is interposed and arranged is adjustable.

According to the above, it will be possible to set the size of the clearance in the loose clamping means to an appropriate size for the amount of curvature of the article to be heat treated to the side of the heat-treated region, and the various kinds of articles to be heat treated having different amounts of curvature can be dealt with.

To allow the position where the non heat-treated region is clamped in each of the plural clamping means to be adjustable, and to allow the size of the clearance in the loose clamping means to which the non heat-treated region is interposed and arranged to be adjustable can be achieved by optional means, for example, by applying a shim as a spacer, making a hole to which a fastener such as a bolt is inserted, further, a so-called turnbuckle mechanism using a right screw and a left screw, and further, a feed screw mechanism.

Furthermore, it is desirable to provide a movement smoothing means for smoothing the movement of the non heat-treated region of the article to be heat treated in the longitudinal direction to the loose clamping means.

According to the above, when the article to be heat treated is curved to be convex on the side of the heat-treated regions, the non heat-treated region moves in the longitudinal direction of the article to be heat treated with respect to the loose clamping means, therefore, the movement can be smoothed by the movement smoothing means, which promotes the thermal expansion of the heat-treated region not being constrained by the non heat-treated region.

The movement smoothing means can be optional, for example, a hardening treatment, plating treatment, polishing performing for component members of the loose clamping means may be suitable, or installation of a rotating member such as a roller for reducing the friction drag or members having a small sliding friction to the loose clamping means may be applicable.

An elongated shaped article to be heat treated and clamped by the clamping device according to the present invention during the heat treatment operation may have a three-dimensional shape or a planar shape.

As one example for the article to be heat treated, an article made of a sheet material includes a three-dimensional shape in which a raised portion, raised in the direction orthogonal to the longitudinal direction and the width direction, at the middle of the width direction orthogonal to the longitudinal direction as well as extending in the longitudinal direction, and also includes two flange portions extending outward in the width direction from a raised portion base ends on both sides across the width in the raised portion, of which at least one portion of the raised portion is a heat-treated region.

In the clamping device for the article to be heat treated, the above-described plural clamping devices are arranged in the longitudinal direction of the article to be heat treated in each of the two flange portions where the non heat-treated regions are.

A quenching for the heat treatment of the article to be heat treated can be conducted from one side in the direction orthogonal to the longitudinal direction and the width direction, in other words, when the direction orthogonal to the longitudinal direction and the width direction is a front-back direction of the article to be heat treated, the quenching can be performed from one side of the front-back direction or can be performed from both sides of the front-back direction.

When the quenching is conducted from one side in the direction orthogonal to the longitudinal direction and the width direction, it is preferable that plural clamping means arranged in the longitudinal direction of the article to be heat treated is used for a clamping device giving the load allowing the article to be heat treated to be convex on one side in the direction orthogonal to the longitudinal direction and the width direction to the non heat-treated regions, and that the quenching for the heat treatment is performed from the other side in the direction orthogonal to the longitudinal direction and the width direction.

The heat-treated region is heated and, after the whole thickness of the article to be heat treated made of a sheet material, at the heat-treated region, is heated to a high temperature uniformly or near uniformly, the quenching performed from one side in the direction orthogonal to the longitudinal direction and the width direction causes a large temperature difference between the quenched side and the reverse side at the moment when the quenching is performed, and causes a compressive yield in the non-quenched side by quenching the side to be quenched. Due to the length reduction in the non-quenched side caused by the compressive yield, when the heat treatment operation is finished, at which clamping by the clamping device is released, a warpage in the article to be heat treated, which is warped to be convex on the quenching side, may occur.

Responding to this, as described above, by using the plural number of clamping means arranged in the longitudinal direction of the article to be heat treated, the load for allowing the article to be heat treated to be convex on one side in the direction orthogonal to the longitudinal direction and the width direction is given to the non heat-treated region, and the quenching is performed from the other side in the direction orthogonal to the longitudinal direction and the width direction, thereby the above described occurrence of warpage can be prevented or reduced, since the heat treatment operation is conducted in a state that the article to be heat treated is curved on the reverse side of the above warpage because of the above-described load.

In order to give the load for allowing the article to be heat treated to be convex on one side in the direction orthogonal to the longitudinal direction and the width direction to the non heat-treated region by the plural number of clamping means arranged in the longitudinal direction of the article to be heat treated, it is preferable that the second clamping means arranged in plural apart from each other in the longitudinal direction of the article to be heat treated from the first clamping means as being the tight clamping means are an automatic clamping means controlled by a control device, and that the order of clamping the article to be heat treated by the second clamping means is controlled by the control device, starts from the clamping means nearest to the first clamping means.

According to the above, to give the load for allowing the article to be heat treated to curve to be convex as described above can be executed smoothly without an unreasonable load to the article to be heat treated.

In addition, the first clamping means may also be the automatic clamping means controlled by the above control device, and the order of clamping the article to be heat treated by the first clamping means may be controlled by the control device, and the order of clamping the article to be heat treated by the first clamping means is set to be before all the second clamping means, as a result, the operation to give the load for allowing the article to be heat treated to curve to be convex without the unreasonable load can be performed automatically.

A method of clamping an article to be heat treated according to the present invention in which an order for clamping the article to be heat treated can be achieved by the first clamping means and the second clamping means includes a first step of clamping an article to be heat treated by a first clamping means as being a tight clamping means holding fixedly the non heat-treated region between the first clamping means and second clamping means arranged in plural in the longitudinal direction of the article to be heat treated, a second step of clamping the article to be heat treated by the plural second clamping means as being a loose clamping means allowing the article to be heat treated to be convex on the side of the heat-treated region, in which the order for the clamping is in the order from near the first clamping means; a third step of heating the heat-treated region; and a fourth step of quenching the article to be heat treated curved to be convex on one side in the direction orthogonal to the longitudinal direction and the width direction by a load given from the first clamping means and the plural second clamping means, from the other side.

The method of clamping can be conducted by controlling all the clamping means by a control device, or a part of the clamping means or all the clamping means can be operated in a manual fashion.

In the present invention, the first clamping means may be arranged in the middle in the longitudinal direction of the article to be heat treated, and one or a plural number of second clamping means may be arranged in the longitudinal direction of the article to be heat treated at both sides across the first clamping means. In this case, the order of clamping the article to be heat treated by the second clamping means starts from the nearest clamping means to the first clamping means at respective sides of the first clamping means.

In the present invention, among plural positions where the non heat-treated regions are clamped by the plural clamping means arranged in the longitudinal direction of the article to be heat treated, at least one position is allowed to be adjustable in the direction orthogonal to the longitudinal direction and the width direction to thereby adjust the size of the load allowing the article to be heat treated to be convex as described above, as well as set exactly the amount of curvature to the amount required by the prevention or reduction of the above-described warpage.

Furthermore, when a quenching is performed from one side in the direction orthogonal to the longitudinal direction and the width direction, the side at which the quenching is performed is one side out of inside and outside of the above raised portion. In this case, it is preferable that the plural clamping means give the load to the article to be heated, for pressing and displacing raised portion base ends on both ends across the width in the raised portion to the above-mentioned one side out of inside and outside of the raised portion in the width direction.

Because the above phenomenon such that the compressive yield is caused in the non-quenched side as a result of being quenched at the quenched side and that the warpage is caused to the article to be heat treated may possibly occur in the width direction of the article to be heat treated.

If the warpage with respect to the width of the article to be heat treated is an unacceptable or uncorrectable degree, the plural clamping means is allowed to be the clamping means giving the load to the article to be heat treated for pressing and displacing raised portion base ends on both sides across the width in the raised portion toward above one side of inside or outside of the raised portion in the width direction, at which the quenching is performed, thereby the occurrence of warpage in the width direction of the article to be heat treated, caused when the load is not given to the article to be heat treated, in other words, the occurrence of deformation in the width direction of the raised portion can be prevented or reduced.

A loose clamping means of the clamping device according to the present invention may be the means providing the length in the longitudinal direction with continuity in the longitudinal direction of the article to be heat treated, or may be the means arranged in plural in a state apart from each other in the longitudinal direction of the article to be heat treated.

According to the latter case, even if the article to be heat treated has a shape bending in the direction orthogonal to the longitudinal direction and the width direction as it extends in the longitudinal direction, the clamping device can be constituted such that the plural loose clamping means are arranged in the longitudinal direction at intervals, therefore a manufacturing operation of components of the loose clamping means or an assembly operation for the clamping device can be made easier.

In addition, each of the plural clamping means in the clamping device according to the present invention may have an optional constitution by optional members. As one example, each of the clamping means can be constituted by including the upper clamping member and the lower clamping means arranged to face each other vertically.

When the plural clamping means arranged in the longitudinal direction of the article to be heat treated are regarded as a first clamping means and a second clamping means arranged in the longitudinal direction of the article to be heat treated, and the first clamping means is regarded as a tight clamping means holding fixedly the non heat-treated region, while the second clamping means is regarded as a loose clamping means as described above, a portion of the non heat-treated region in the article to be heat treated is held tightly by the upper clamping member and the lower clamping member composing the first clamping means, and a clearance between the upper clamping member and the lower clamping member composing the second clamping means is made to be wider than the thickness of the portion of the non heat-treated region in the article to be heat treated.

In order to hold tightly the portion of the non heat-treated region by the first clamping means, at least one member of the upper clamping member and the lower clamping member in the first clamping means is allowed to make a movement such as swinging or sliding against the other member. This movement may be performed manually or automatically by a driving means such as a cylinder. Also, in order to securing a wider clearance than the thickness of the portion of the non heat-treated region, between the upper clamping member and the lower clamping member of the second clamping means as being the loose clamping means, at least one member of the upper clamping member and the lower clamping member in the second clamping means is allowed to make a movement such as the swinging or the sliding against the other member. This movement can also performed manually or automatically by a driving means such as the cylinder.

Mechanisms for allowing at least one of the upper clamping member and the lower clamping member in the first and second clamping means to make a movement such as the swinging or the sliding against the other are optional. As one of them, a toggle mechanism can be cited. The operation of the toggle mechanism can be conducted manually or automatically by a driving means such as a cylinder.

When at least one clamping means of the respective clamping means is constituted by the toggle mechanism, for example, when the article to be heat treated is allowed to curve to be convex on one side in the direction orthogonal to the longitudinal direction and the width direction as described above, the clamping member of the clamping means pressing the article to be heat treated is allowed to make a clamping movement to a position where the clamping member is not pushed back by a large reaction force from the article to be heat treated. Additionally, the clamping movement can be made in an instant by inputting a small clamping load to the clamping means by the manual operation or the automatic driving means, such as the cylinder. When the toggle mechanism having such a characteristic is utilized for the second clamping means as being a loose clamping means, a clearance for clamping loosely the article to be heat treated can be secured in a stable size without yielding by the large reaction from the article to be heat treated.

Furthermore, to perform the heat treatment operation by clamping the portion of the non heat-treated region in the article to be heat treated by means of the upper clamping member and the lower clamping member of the plural clamping means arranged in the longitudinal direction of the article to be heat treated, the upper and lower clamping members may be installed to a work table to which the article to be heat treated is set.

When at least one clamping means of the plural clamping means arranged in the longitudinal direction of the article to be heated is constituted by including the upper clamping member and the lower clamping member facing vertically, at least one clamping member between the upper and lower clamping members can be installed to a raising and lowering member moving vertically with respect to the other member. When one member moves toward the other member by the raising and lowering member, the article to be heat treated is clamped by the upper clamping member and the lower clamping means and when the one member moves away from the other member, the clamping by the upper and lower clamping members is released.

When the lower clamping member out of the upper clamping member and the lower clamping member is installed to the raising and lowering member, the article to be heat treated is placed on the lower clamping member. Then, by raising the lower clamping means, the article to be heat treated can be clamped by the upper clamping member and the lower clamping member.

When the article to be heat treated is placed on the lower clamping member, the placement can be conducted while the lower clamping member is on the way to being raised by the raising and lowering member, or before the lower clamping member is on the way to being raised by the raising and lowering member.

When the placement of the article to be heat treated to the lower clamping member is conducted while the lower clamping member is on the way of being raised by the raising and lowering member, for example, a rail guiding a travel of a traveling body on which the article to be heat treated is placed is installed at the middle of the height position where the lower clamping member is raised by the raising and lowering member, thereby the article to be heat treated is transferred from the traveling body to the lower clamping body while the lower clamping member is on the way of being raised by the raising and lowering member.

When the placement of the article to be heat treated to the lower clamping member is conducted before the lower clamping means begins to be raised by the raising and lowering member, for example, the raising and lowering member is disposed to the traveling body traveling to the position just below the upper clamping member, the article to be heat treated is placed on the lower clamping member before the traveling body reaches just below the upper clamping member.

As the examples described above, when the lower clamping member is installed to the raising and lowering member which is raised and lowered toward the upper clamping member, the upper clamping member can be arranged to an immovable member which is not raised and lowered toward the lower clamping member. A heating device can be installed on the immovable member for heating the heat-treated region of the article to be heat treated.

When the heating device is thus installed to the immovable member, the whole structure of the clamping device can be simplified because the heating device itself as well as attachments for the heating device such as electric cables or pipings are not moved vertically.

In the present invention, the heating device for heating the heat-treated region of the article to be heat treated can be optional, an induction-heating type device by a high-frequency current, or a gas-fire type device, or a laser-beam type device can be applied.

In addition, the heating device can be a bulk-heating type device heating the whole of the heat-treated region simultaneously, or a device having a heating unit for heating a part of the heat-treated region, which heats the whole of the heat-treated region by movement of the heating unit with respect to the article to be heat treated, can be applied.

Furthermore, the clamping device according to the present invention can be used when articles utilized for optional application have been heat treated. One example of the articles is a reinforcing member for a center pillar of a four-wheeled vehicle. As other examples, a front bumper or rear bumper of a four-wheeled vehicle, and further as one of other examples, an impact beam of a vehicle door.

A typical example of the heat treatment is hardening. The clamping device according to the present invention can be applied for not only the hardening operation but also another heat treatment operation such as a tempering operation or an annealing operation after the hardening operation, and further, the heat treatment operation accompanying a shape correction. The clamping device according to the present invention can be also applied for a heat treatment operation for allowing a whole hardened region to be a tempered region, or a heat treatment operation such that an inclusive region including one or a plural number of hardening regions is regarded as a tempering region, and regions except the inclusive region is regarded as a non-tempering region. Furthermore, in order to improve the processability with reference to a region receiving a strong deformation to a blank to be press-formed, the clamping device according to the present invention can be applied to the case when a softening operation such as an annealing for the region is performed, and when the heat treatment operation for softening a region that is easy to buckle is performed to a part of a press-formed article.

EFFECT OF THE INVENTION

According to the present invention, a heat treatment operation can be performed which suppresses a wave-shaped deformation at the non heat-treated region of the article to be heat treated.

EXPLANATION OF CODES

| | |
|---|---|
| 10, 160 | article to be heat treated |
| 11, 161 | raised portion |
| 12, 162 | raised portion base end |
| 13, 163 | flange portion |
| 14, 164 | hardening region as being heat-treated region |
| 15, 165 | non-hardening region as being non heat-treated region |
| 20, 100, 130, 170, 220 | clamping device |
| 21, 221 | work table |
| 22, 52, 112, 172, 222 | first clamping means |
| 23, 53, 73, 113, 173, 223 | second clamping means |
| 32, 82, 123, 140 154, 182 | clearance |
| 40, 124, 190 | heating device |
| 42, 120, 192 | coolant circulating pipe as being cooling device |
| 103 | raising and lowering member |
| 104 | immovable member |
| 114, 116, 136, 146 | upper clamping member |
| 115, 117, 137, 147 | lower clamping member |
| 240 | control device |

BEST MODE FOR CARRYING OUT THE INVENTION

Figure 1:
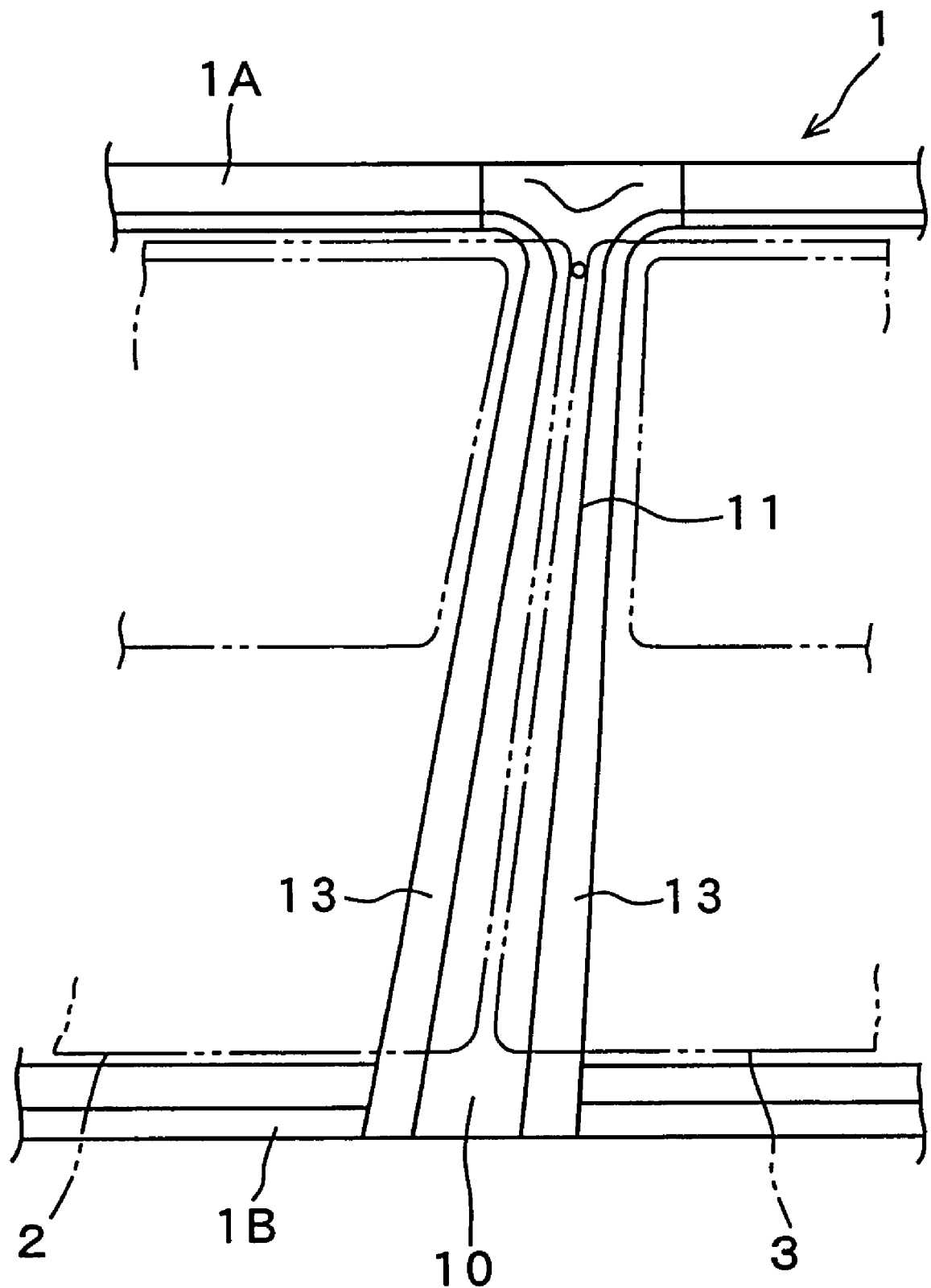
FIG. 1 is an enlarged view showing a part of a side panel of a four-wheeled vehicle to which a reinforcing member for a center pillar, which is clamped by a clamping device according to an embodiment of the present invention is applied.

Hereinafter, some modes for embodying the present invention with reference to the drawings. A heat treatment according to the present embodiment is hardening and an article to be hardened as an article to be heat treated is a reinforcing member for a center pillar of a four-wheeled vehicle. As shown in FIG. 1, the reinforcing member for the center pillar 10 is a member composing a side panel 1 of a vehicle, installed between a roof portion 1A and a floor portion 1B of the side panel 1 from above to below in order to increase the strength of the side panel 1 against a side collision between a front door 2 and a rear door 3.

Figure 2:
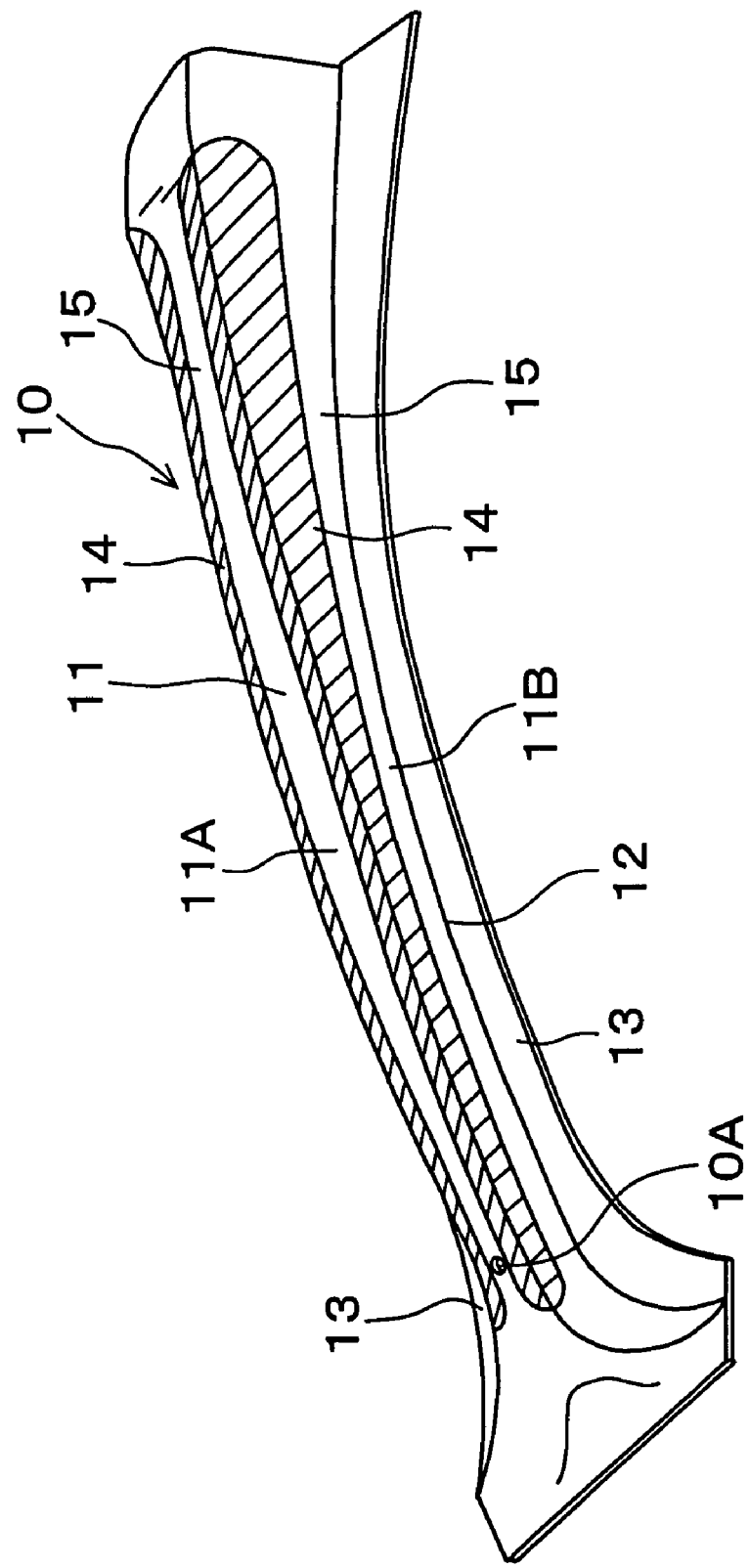
FIG. 2 is a perspective view showing the whole of the reinforcing member for the center pillar as being an article to be heat treated.

As shown in FIG. 2, the reinforcing member for the center pillar 10, as a press-formed article made of a steel sheet having an elongated shape, provides a raised portion 11 raised in a direction orthogonal to the longitudinal direction as well as to the width direction at the middle of the width direction orthogonal to the longitudinal direction thereof. Two flange portions 13 extend outward in the width direction from raised portion base ends 12 on both sides across the width direction in the raised portion 11 extending in the longitudinal direction of the reinforcing member 10. Accordingly, the cross-sectional shape at the middle of the reinforcing member 10 in the longitudinal direction is hat-shaped, and the flange portion 13 and a top surface portion 11A of the raised portion 11 are connected via a side surface portion 11B of the raised portion 11. The connecting portion between the side surface portion 11B and the flange portion 13 is the raised portion base end 12.

Hardening regions 14 as heat-treated regions shown by the range denoted by hatching in FIG. 2 are defined across the top surface portion 11A and the side surface portion 11B of the raised portion 11. The hardening regions 14 extending in the longitudinal direction of the reinforcing member 10 exist at both sides across the width direction of the raised portion 11, and both sides across the width of the respective hardening regions 14 are non-hardening regions 15 as non heat-treated regions. To the reinforcing member 10 having a three-dimensional elongated shape, two hardening regions 14 defined to be extending in the longitudinal direction of the reinforcing member 10 are provided in the width direction orthogonal to the longitudinal direction, and three non-hardening regions 15 are provided in the width direction. These hardening regions 14 and non-hardening regions 15 are provided side by side alternately in the width direction.

The flange portions 13 belong to the part of the non-hardening regions 15. The reinforcing member 10 is clamped for a hardening operation by a clamping device 20 shown in FIG. 3 at the flange portions 13. Since the clamping by the clamping device 20 is performed such that the longitudinal direction of the reinforcing member 10, being an object for the hardening operation, is regarded as the horizontal direction or nearly horizontal direction, the reinforcing member 10 is referred to as an article to be heat treated 10, the horizontal direction in which the article to be heat treated 10 extends is referred to as an X direction, the width direction of the article to be heated 10 orthogonal to the X direction is referred to as a Y direction and the direction orthogonal to the X direction and Y direction is referred to as a Z direction.

The clamping device 20 provides a first clamping means 22 and a second clamping means 23 on a work table 21 on which the article to be heat treated 10 is set for the hardening operation. In other words, the work table 21 is a table with the clamping device 20. The first clamping means 22 and the second clamping means 23 arranged in the X direction clamp the flange portion 13. In the X direction, the number of the first clamping means 22 is one, while the number of the second clamping means 23 arranged apart from each other, from the first clamping means 22, in the X direction is plural, four in the present embodiment. As described above, there are two flange portions 13 in the Y direction, and the above numbers of the first clamping means 22 and the second clamping means 23 are provided for each flange portion 13, therefore, the clamping device 20 is equipped with twice the number of the first clamping means 22 and the second clamping means 23. The article to be heat treated 10 is set in a fixed position with a horizontal orientation or with a nearly horizontal orientation to the clamping device 20 by means of the first clamping means 22 and the second clamping means 23.

Figure 4:
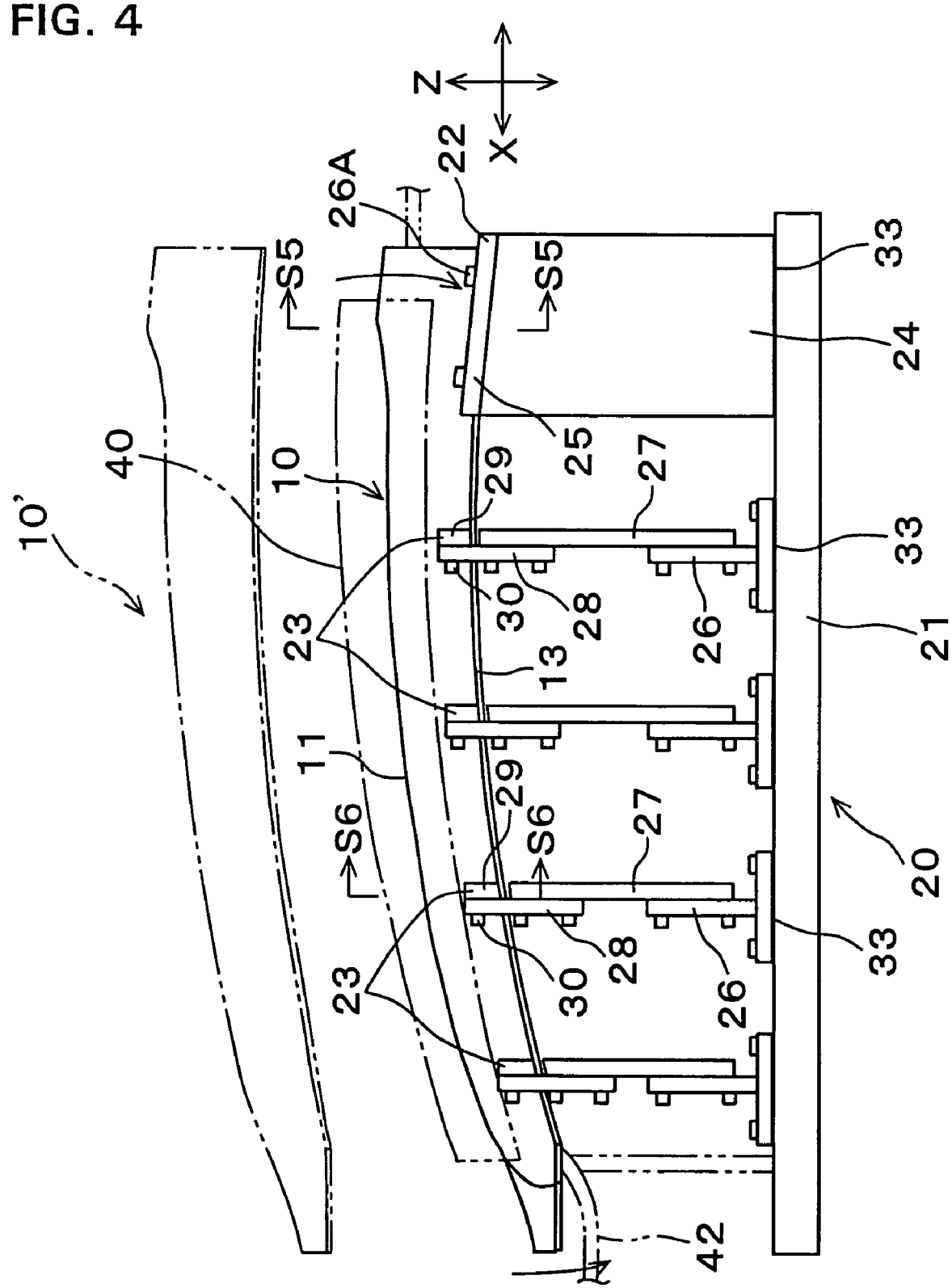
FIG. 4 is a front view of the clamping device in FIG. 3.
Figure 5:
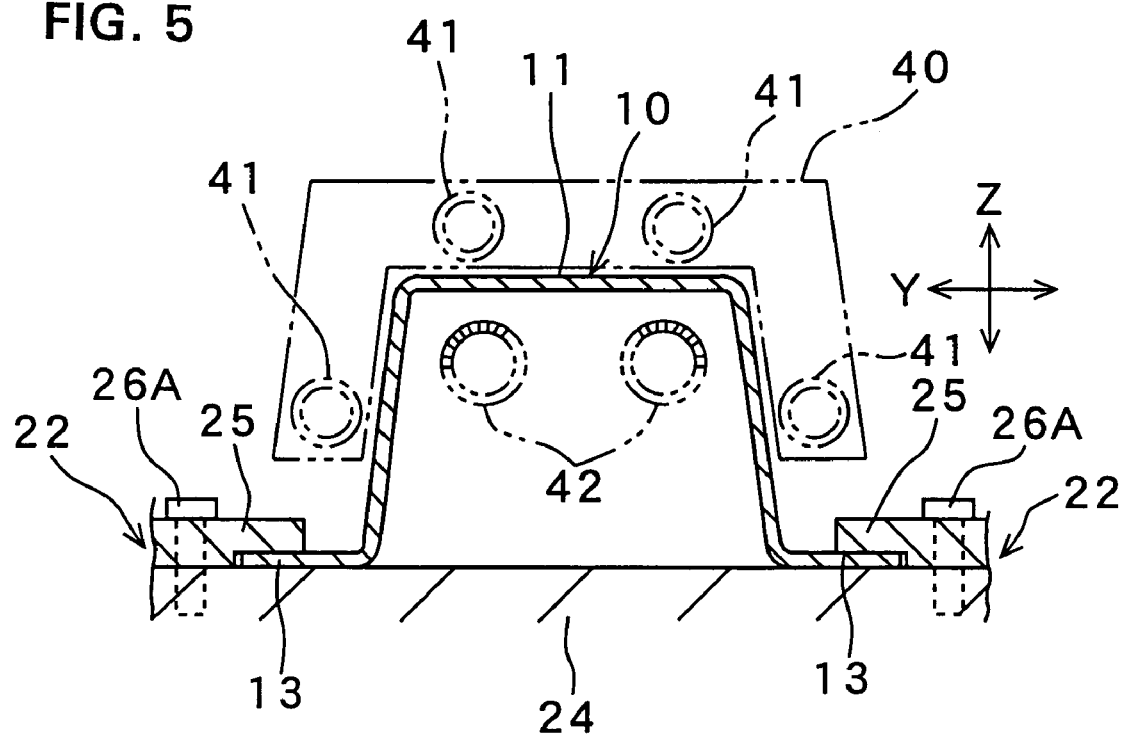
FIG. 5 is a cross-sectional view taken along the line S5-S5 in FIG. 4.
Figure 6:
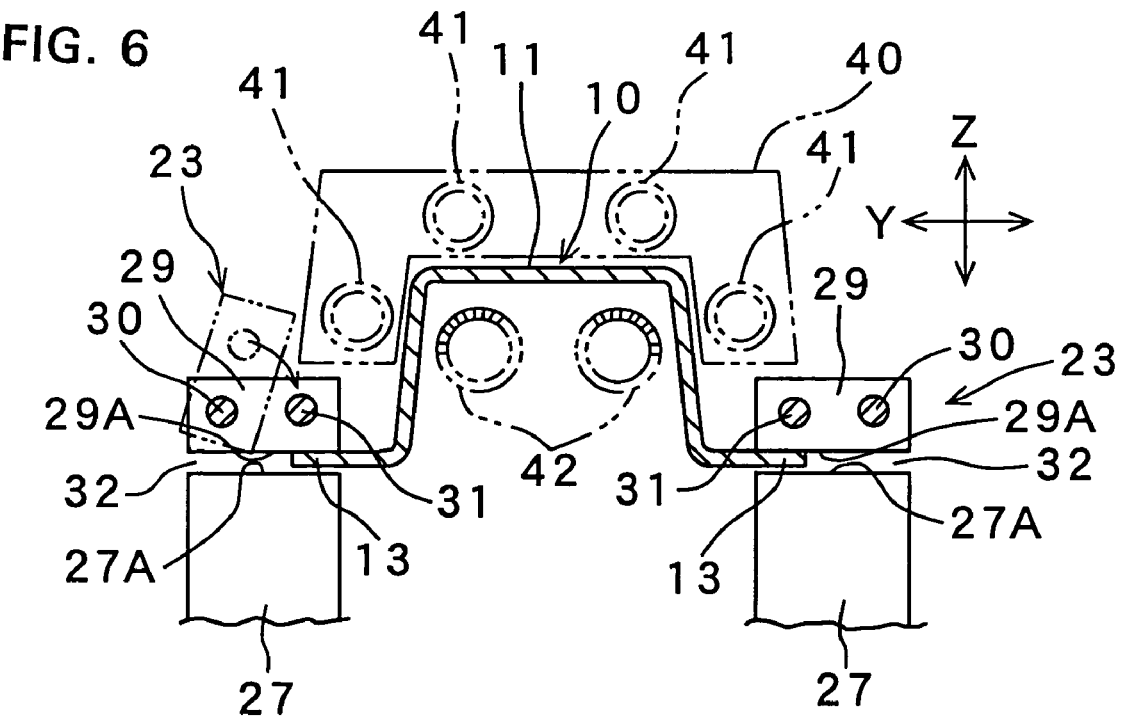
FIG. 6 is a cross-sectional view taken along the line S6-S6 in FIG. 4.

A front view of the clamping device 20 is shown in FIG. 4, and the structure of the first clamping means 22 disposed at one end along the X direction is shown in FIG. 5 which is a cross-sectional view taken along the S5-S5 line in FIG. 4. Besides, there is shown in FIG. 6, which is a cross-sectional view taken along the S6-S6 line in FIG. 4, the structure of the third second clamping means 23 counted from the first clamping means 22 among four second clamping means 23 arranged in a state apart from each other toward the other end along the X direction from the first clamping means 22. All the second clamping means 23 have the same structure.

Figure 3:
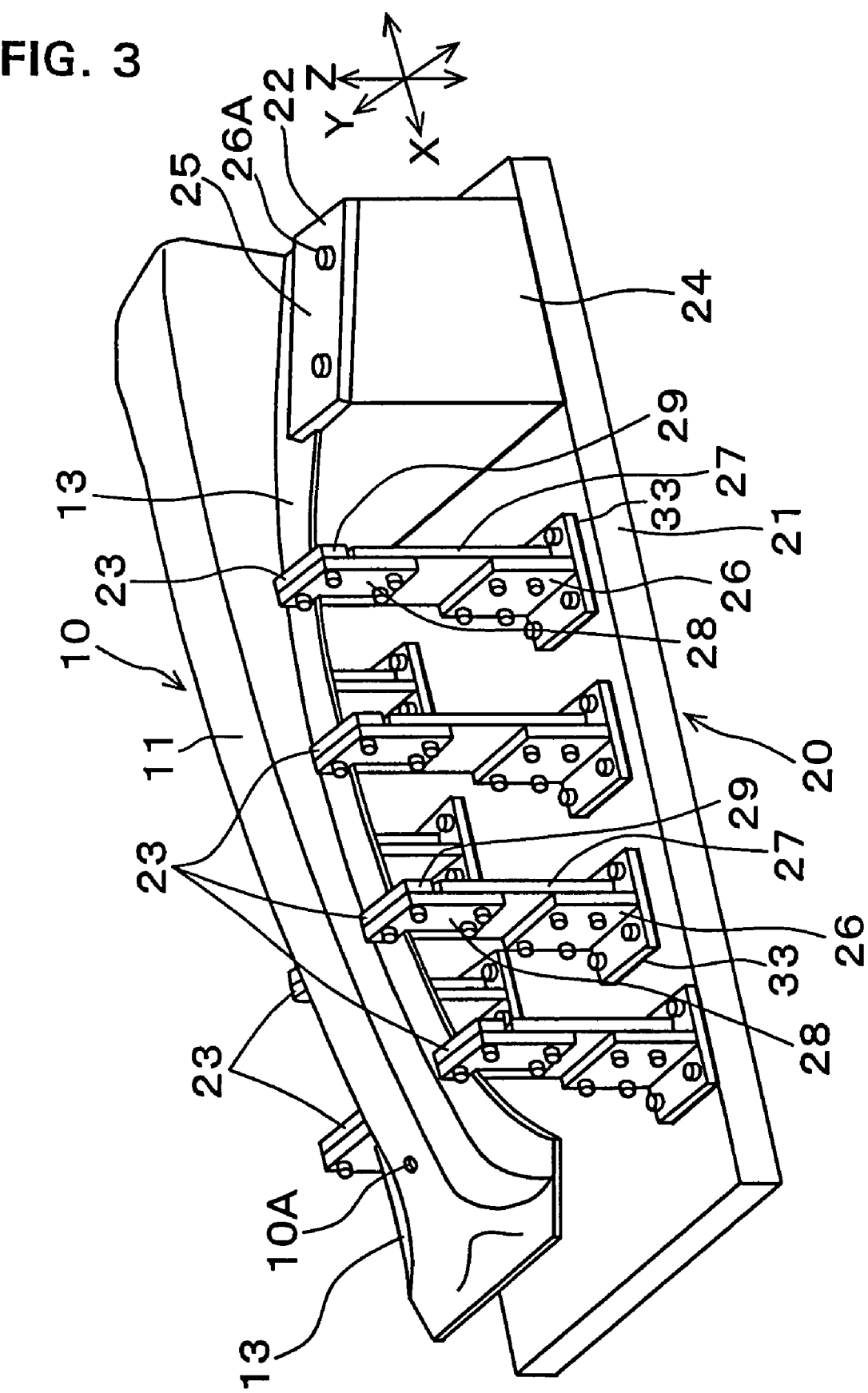
FIG. 3 is a perspective view showing the whole of a clamping device clamping the reinforcing member for the center pillar as the article to be heat treated.

As shown in FIG. 3 and FIG. 4, the first clamping means 22 is composed of a base 24 installed fixedly on the work table 21 and a retaining member 25 fastened on the upper surface of the base 24 by a detachable fastener 26A. As shown in FIG. 5, the flange portion 13 is held tightly from above and from below with the base 24 and the retaining member 25 by fastening the retaining member 25 on the base 24 by the fastener 26A. Thus, the first clamping means 22 is a tight clamping means for clamping the flange portion 13 immovably by means of the base 24 and the retaining member 25 as a lower clamping member and a upper clamping member.

Each of the second clamping means 23 is composed of, as shown in FIG. 3 and FIG. 4, a clamp body 27 joined to a bracket 26 provided on the work table 21 and a retaining member 29 coupled to the clamp body 27 via a coupling member 28. As shown in FIG. 6, the retaining member 29 arranged above the clamping body 27 is vertically swingable with respect to the coupling member 28 around a shaft 30, as well as arranged to face the clamp body 27 vertically with a predetermined clearance 32 in the Z direction by fitting holes formed at the retaining member 29 and the coupling member 28 to each other, and by inserting a pin 31 in these holes. Accordingly, the flange portion 13 can be placed into the clearance 32 by the swinging downward motion of the retaining member 29 around the shaft 30 and the insertion of the pin 31 into the above-mentioned holes. The size of the clearance 32 is wider than the thickness of the flange portion 13.

The second clamping means 23 is a loose clamping means clamping the flange portion 13 movably in the X direction and in the Z direction. The clamp body 27 is a lower clamping member of the second clamping means 23 and the retaining member 29 is an upper clamping member of the second clamping means 23.

The article to be heat-treated 10 is set on the work table 21 with the flange portion 13 clamped by the first clamping means 22 and the second clamping means 23 as described above is in a state that it curves to be convex on its upper side in the Z direction, which is the vertical direction, as compared with the article to be heated 10' in a natural, unloaded state shown by the two-dot chain line in FIG. 4. Namely, the article to be heat treated 10 is clamped by the clamping device 20 in such a state that the load for allowing the article to be heated 10 to be convex on a surface side of the article to be heated 10, which is the raised direction of the raised portion 11, is given to the flange portion 13 by means of the first clamping means 22 and the second clamping means 23. Thus, at the setting position of the second clamping means 23 as shown in FIG. 6, the retaining member 29 abuts on the upper surface of the flange portion 13 and a clearance is provided between the lower surface of the flange portion 13 and the clamp body 27.

In order to adjust finely the amount of curvature of the article to be heat treated 10, the position where the flange portion 13 is clamped in the first clamping means 22 and the position where the flange portion 13 is clamped in the second clamping means 23 can be adjusted in the present embodiment. The adjustment in the Z direction is performed by interposing a shim 33 as a spacer having an appropriate thickness between the work table 21 and the base 24 of the first clamping means 22, and between the work table 21 and the bracket 26 of the second clamping means 23 as shown in FIG. 4.

A hardening processing and a polishing are performed for a upper surface of 27A of the clamp body 27 and for a lower surface 29A of the retaining member 29 in the second clamping means 23 shown in FIG. 6, facing each other with the flange portion 13 interposed therebetween when the article to be heat treated 10 is clamped. Thereby, the second clamping means 23 includes a movement smoothing means for smoothing the movement of the flange portion 13 toward the X direction.

In addition, the upper surface 27A of the clamp body 27 and the lower surface 29A of the retaining member 29 are the surfaces facing the flange portion 13 and each other in parallel or in nearly parallel.

As shown in FIG. 4, above the work table 21, a heating device 40 for heating the hardening region 14 of the article to be heated 10 clamped by the clamping device 20 is movably provided up and down. Since the heating device 40 in the present embodiment is a device for heating inductively the heating region 14 by the high-frequency current, heating inductors 41 to which the high-frequency current is supplied from a power supply device, not shown, are provided to the heating device 40 as shown in FIG. 5 and FIG. 6. These heating inductors 41 are arranged at the heating device 40, covering the whole hardening region 14, therefore, the heating device 40 is an induction heating device of the bulk-heating type which can heat the whole region of the hardening region 14 simultaneously.

The heating device 40 is raised and lowered by a raising and lowering means. When the article to be heated 10 is clamped by the clamping device 20, the heating device 40 is lowered and set above the article to be heat treated 10.

As shown in FIG. 4, a coolant-circulating pipe 42 as a cooling device is provided on the work table 21. When the article to be heated 10 is set on the work table 21, clamped by the clamping device 20, the coolant-circulating pipe 42 in which a coolant ejection nozzle is formed is inserted inside the raised portion 11 of which an opening faces downward as shown in FIG. 5 and FIG. 6.

After the article to be heated 10 is clamped by the clamping device 20 and set on the work table 21, the heating device 40 is lowered and set above the article to be heated 10. Then, the whole hardening region 14 of the article to be heated 10 is heated inductively from the surface side of the article to be heat treated 10 in bulk and simultaneously by the distribution of the high-frequency current to the heating device 40 from the above-mentioned power supply device. The distribution of electric current is stopped after the hardening region 14 is heated to the predetermined temperature. Subsequently, the coolant is ejected from the ejection nozzle of the coolant-circulating pipe 42 to thereby quench the article to be heated 10 from a reverse side and the hardening region 14 is hardened. After that, the clamping of the article to be heated 10 by the clamping device 20 is released and sent to a next process such as a painting process.

When the hardening regions 14 of the article to be heated 10 clamped by the clamping device 20 are heated by the heating device 40, the hardening regions 14 defined at parts of the top surface portion 11A or the side surface portions 11B of the raised portion 11, as explained in FIG. 2, expand thermally against the rest of the parts of the side surface portions 11B or the non-hardening regions 15 provided at the flange portion 14. Since the hardening regions 14 extend in the X direction, due to the thermal expansion of these hardening regions 14, the whole article to be heat treated 10 begins to curve to be convex, with respect to the X direction, on the side of the top surface portion 11A of the raised portion 11 to which the hardening regions 14 are provided. In other words, a curving deformation begins to occur in the article to be heated 10 so that the difference between the heights in the Z direction at the center of the X direction and at an end of the X direction is enlarged.

In the clamping device 20 of the present embodiment, the first clamping means 22 arranged at one end in the X direction is a tight clamping means holding the flange portion 13 fixedly as described above, while the respective second loose clamping means 23 arranged at the side of the other end of the X direction, apart from the first clamping means 22, are loose clamping means having the clearance 32 in the Z direction wider than the thickness of the flange portion 13, therefore the clamping device 20 allows the article to be heat treated 10 to be convex on the side of the top surface portion 11A of the raised portion 11. Thus, the thermal expansion in the hardening regions 14 is not repressed by the non-hardening region 15, or the repression by the non-hardening region 15 is loosened.

Accordingly, the compressive yield does not occur or hardly occurs to the hardening region 14 when the article to be heated 10 is heated, and the decrease of length of the hardening region 14 in the X direction resulted from the occurrence of the compressive yield does not arise or hardly arises. Therefore, when the hardening operation is finished at which the clamping by the clamping device 20 is released, a large compressive stress exceeding the elastic limit, which is a stress corresponding to a tensile stress occurring in the hardening region 14 when the compressive yield occurs, can be suppressed to occur in the non-hardening region 15. As a result, a wave-shaped deformation at the flange portion 13, being the non-hardening region 15, can be prevented or reduced.

If the article to be heated 10 is curved to be convex on the side of the top surface portion 11A of the raised portion 11 due to the thermal expansion by the heating of the hardening region 14, the flange portion 13 moves slightly to one side of the X direction at the second clamping means 23 which is the loose clamping means. This movement is made while the flange portion 13 touches the upper surface 27A of the clamp body 27 or the lower surface 29A of the retaining member 29 composing the second clamping means 23 in FIG. 6. In the present embodiment, the hardening processing and the polishing are performed at the upper surface 27A of the clamp body 27 and the lower surface 29A of the retaining member 29 as described above to thereby allow the second clamping means 23 to have the movement smoothing means moving the flange portion 13 smoothly, as a result, the flange portion 13 can move smoothly with respect to the second clamping means 23.

Also from this point of view, the flange portion 13 as being the non-hardening region 15 does not repress the thermal expansion of the hardening region 14 to thereby help the prevention of the compressive yield from occurring.

As described above, the upper surface 27A of the clamp body 27 and the lower surface 29A of the retaining member 29 are surfaces facing each other in parallel or in nearly parallel to the flange portion 13, therefore, the upper surface 27A and the lower surface 29A receive a load in the Z direction from the flange portion 13 with a certain dimension to thereby suppress the occurrence of deformation on the flange portion 13, such as a recession at the arranged position of the second clamping means 23.

A quenching carried out by ejecting the coolant from the coolant circulating pipe 42 is performed from the underside with respect to the article to be heat treated 10 in the present embodiment, in other words, it is performed from the reverse side of the article to be heated 10. Considering the hardening region 14 defined to be extending in the X direction, when the reverse side of the article to be heated 10 is quenched by the coolant ejection after the whole thickness of the article to be heated 10 is heated to a uniform or nearly uniform temperature in the hardening region 14, there exists an obverse thickness portion having the high temperature and a reverse thickness portion having the temperature lowered to near the room temperature in the thickness direction of the article to be hearted 10 at the time when the quenching is performed. As a result, the compressive yield in the X direction occurs to the obverse thickness portion by constraint of the reverse thickness portion. Owing to the reduction in a linear dimension in the X direction at the obverse thickness portion caused by the compressive yield, the article to be heat treated 10 incurs warpage to be convex on the reverse side when the hardening operation is finished with the clamping by the clamping device 20 released.

However, as described above, in the clamping device 20 according to the present embodiment, the load allowing the article to be heat treated 10 to be convex in the raised direction of the raised portion 11 is given to the flange portion 13 at the first clamping means 22 and the second clamping means 23. Since the article to be heat treated 10 is thus clamped in the state that it curves to be convex on the obverse side and the heating and the quenching for the hardening operation are performed in this state, the occurrence of warpage in the article to be heated 10 described above can be prevented or reduced.

Furthermore, in the present embodiment, the position where the flange portion 13 is clamped at the first clamping means 22 and the position where the flange portion 13 is clamped at the second clamping means 23 can be adjusted by changing the thickness of the shim 33 interposed between the work table 21 and the base 24, as well as between the work table 21 and the bracket 26 shown in FIG. 4. Accordingly, the above-mentioned amount of curvature in the article to be heat treated 10 clamped by the clamping device 20 can be adjusted. As a result, the amount of curvature can be set accurately to the necessary amount for preventing or reducing the above-mentioned warpage occurring in the article to be heat treated 10.

The warpage mentioned above is with respect to the X direction. Since the hardening region 14 also has a dimension in the Y direction, though it is small, warpage similar to the above occurs also in the direction to broaden an opening width of the raised portion 11. However, the dimension of the hardening region 14 in the Y direction is small, and the dimension of the whole article to be heated 10 in the Y direction is also small as compared with the dimension in the X direction, therefore, the warpage in the Y direction is not such a serious problem. The side surface portion 11B in the raised portion 11 of the article to be heat treated 10 has a spring characteristic in the Y direction against the top surface portion 11A, therefore, the warpage of the article to be heat treated 10 in the Y direction can be corrected at the time of post work such as work for assembling the article to be heat treated 10 with other members. Accordingly, any means for curing or reducing the warpage in the Y direction is not provided to the clamping device 20 according to the present embodiment.

Needless to say, means for curing or reducing the warpage in the Y direction can be provided to the clamping device. An embodiment for such a clamping device will be described with reference to FIG. 23 to FIG. 25.

According to the present embodiment, the second clamping means 23 as a loose clamping means is not the means having a large length continuing in the X direction, and the plural second clamping means 23 of which dimensions in the X direction are short are arranged in the X direction at intervals. Therefore, even if the flange portion 13 clamped by the second clamping means 23 has the shape bending in the Z direction according as it extends in the X direction, the production operation of the clamp body 27 and the retaining member 29 forming the above-described clearance 32 in which the flange portion is disposed shown in FIG. 6 can be performed easily, as well as the assembly operation of the clamping device 20.

Figure 7:
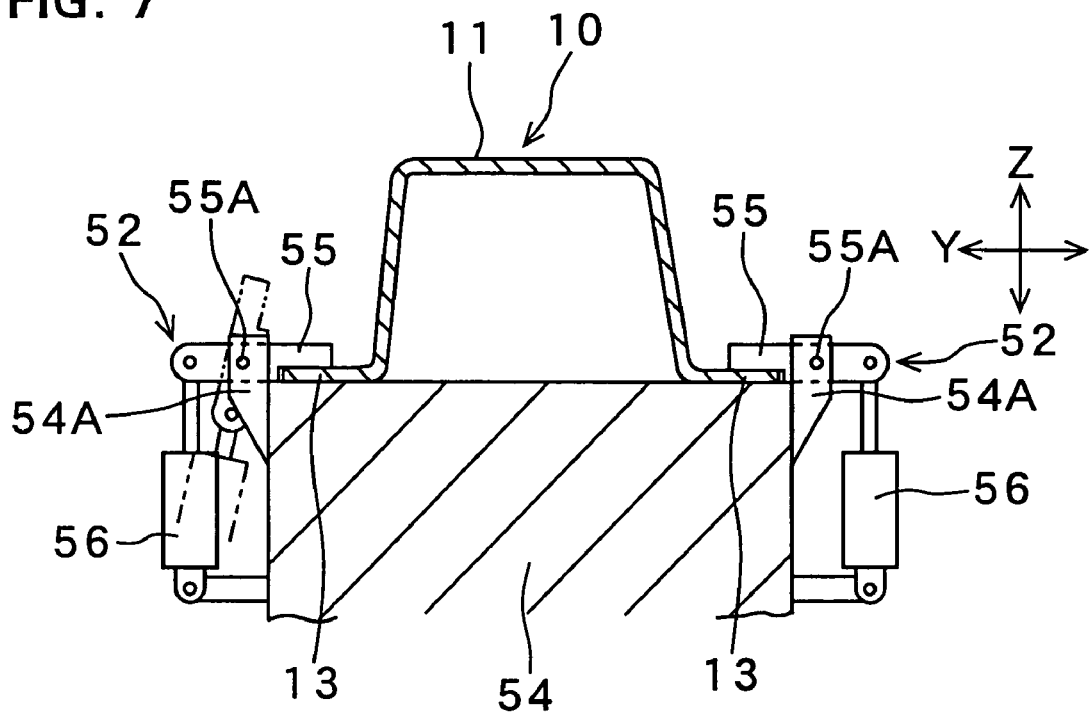
FIG. 7 is a similar view to FIG. 5 showing a first clamping means of an embodiment in which a clamping and a releasing of the clamping for the article to be heat treated can be automatically performed.
Figure 8:
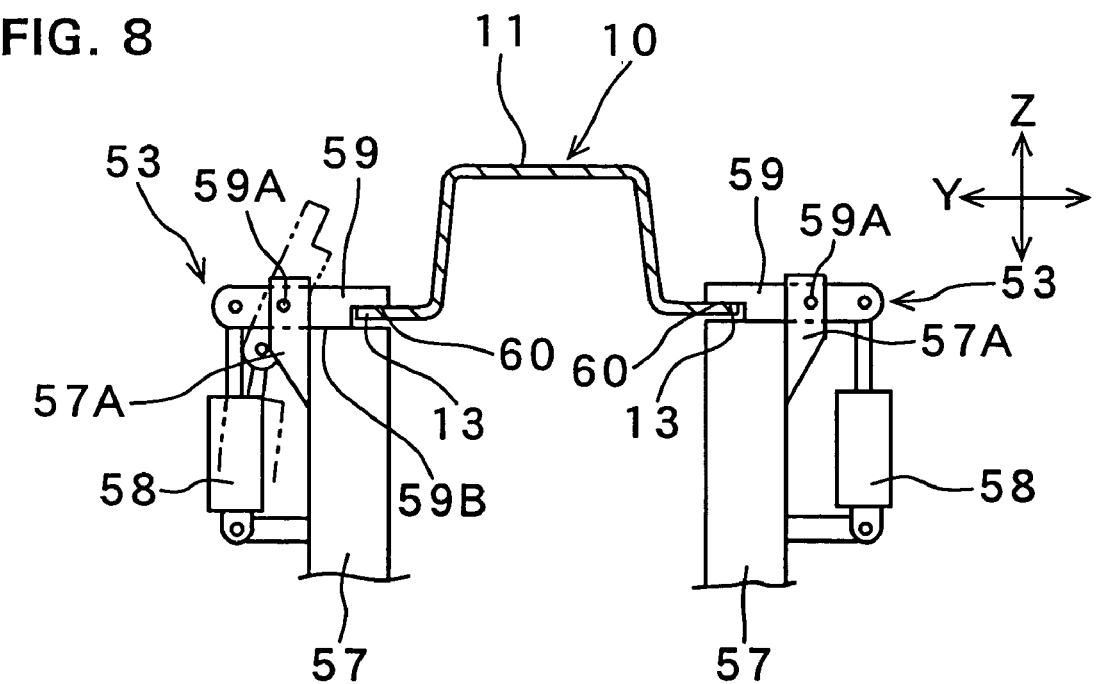
FIG. 8 is a similar view to FIG. 6 showing a second clamping means of an embodiment in which the clamping and the releasing of the clamping for the article to be heat treated can be automatically performed.

FIG. 7 and FIG. 8 show a first clamping means 52 and a second clamping means 53 whereby a clamp operation and a clamp-releasing operation of the flange portion 13 are performed automatically.

The first clamping means 52 in FIG. 7 is constituted such that a retaining member 55, which is a upper clamping member, is attached to a bracket 54A provided on a base 54, which is a lower clamping member, so as to be swingable vertically around a shaft 55A and a hydraulic cylinder 56 is coupled to the retaining member 55 which is lever-operated. The retaining member 55 clamps tightly the flange portion 13 with the base 54 and releases the clamping by the swing of the hydraulic cylinder 56.

Similarly, the second clamping means 53 in FIG. 8 is constituted such that a retaining member 59, as an upper clamping member, is attached to a bracket 57A provided on a clamp body 57, as a lower clamping member, so as to be vertically swingable around a shaft 59A and a hydraulic cylinder 58 is coupled to the retaining member 59 which is lever-operated. The retaining member 59 clamps loosely the flange portion 13 with the clamp body 57 and releases the clamping by the swing of the hydraulic cylinder 58.

In order to clamp loosely the flange portion 13 with the clamp body 57 and the retaining member 59, a notch portion 60 in which the flange portion 13 can be interposed is formed at the lower surface of the tip of the retaining member 59 on the flange portion 13 side. The vertical dimension of the notch portion 60 when a lower surface 59B of the retaining member 59 abuts on the upper surface of the clamp body 57 is larger than the thickness of the flange portion 13.

The cylinder for allowing the retaining portions 55, 59 to swing in FIG. 7 and FIG. 8 may be an air cylinder.

Figure 9:
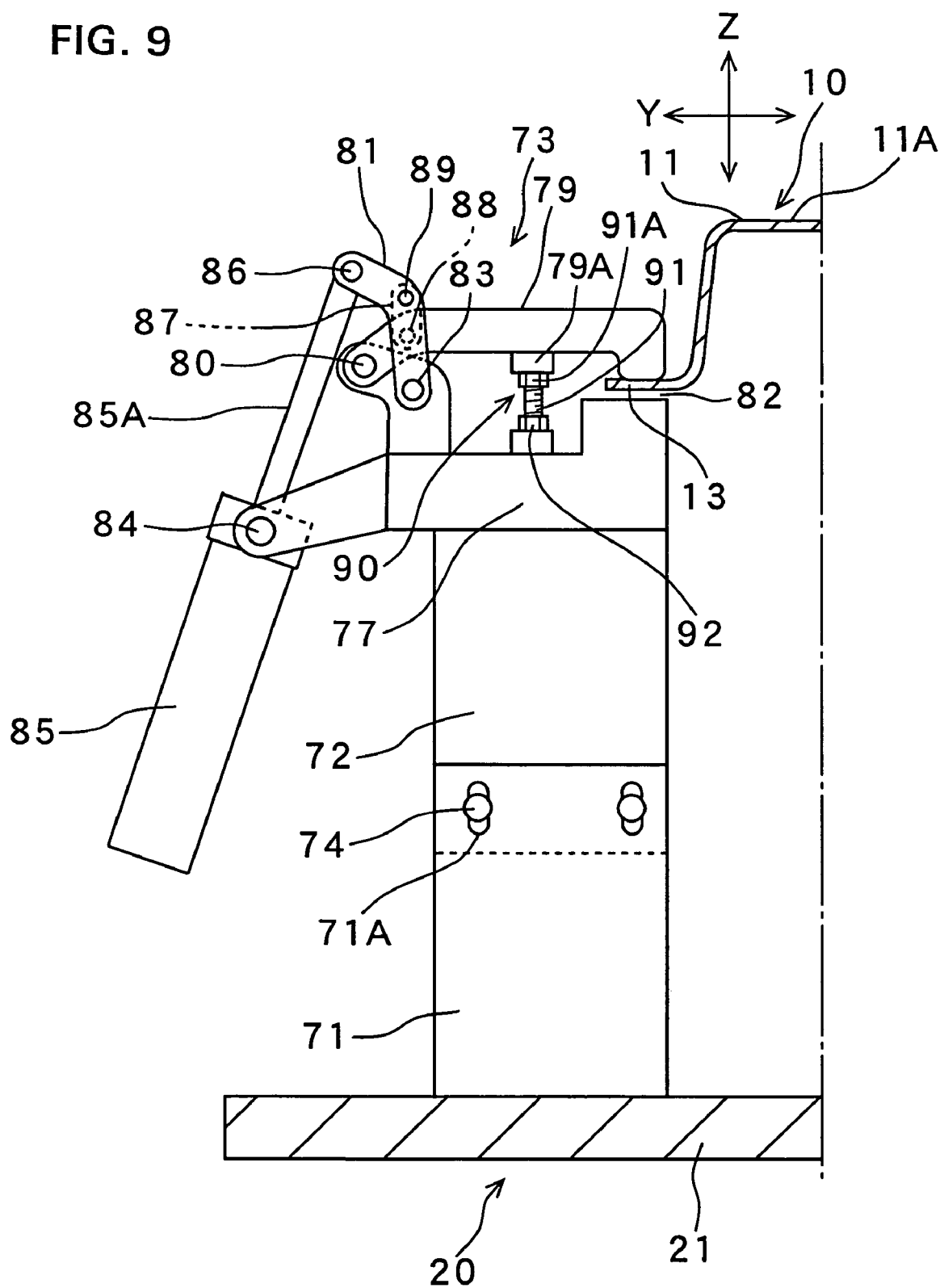
FIG. 9 is a view showing an embodiment in which the second clamping means has a structure of a toggle mechanism, showing one of the second clamping means arranged on both sides across a width of the article to be heat treated.
Figure 10:
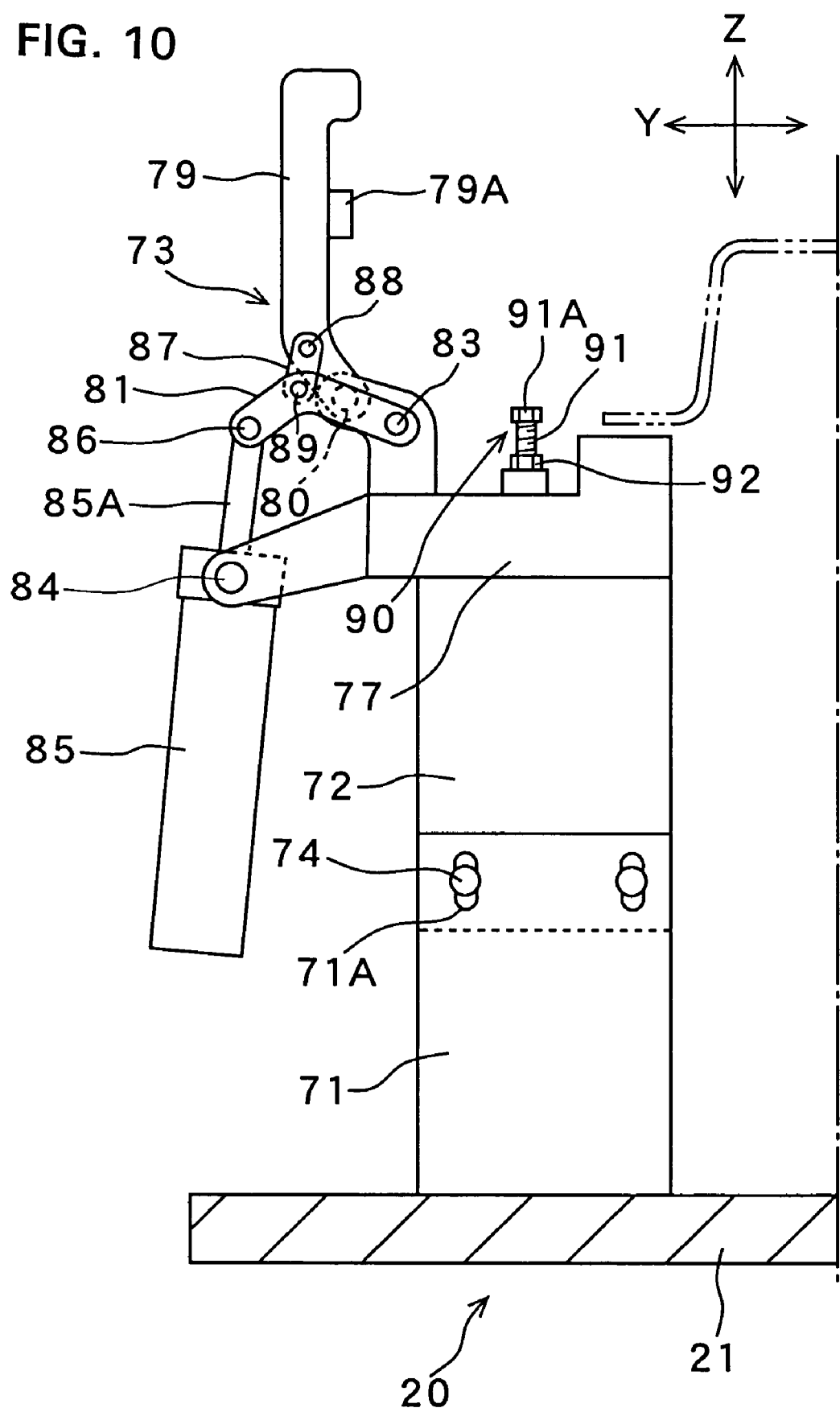
FIG. 10 is a view showing a state in which the second clamping means releases the clamping in the embodiment in FIG. 9.

FIG. 9 shows an embodiment in which a second clamping means 73, as a loose clamping means of the clamping device 20, has a structure of a toggle mechanism, while FIG. 10 shows a state when the clamping by the second clamping means 73 is released. Since the structure of the second clamping means 73, arranged on both sides in the Y direction of the article to be heat treated 10, has a symmetrical shape with respect to the Y direction, only one side of the second clamping means 73 is shown.

A raising and lowering member 72 is installed on a base member 71 fixed on the work table 21 of the clamping device 20 and a clamp body 77 of the second clamping means 73 is installed on the upper surface of the raising and lowering member 72. The installation of the raising and lowering member 72 to the base member 71 is carried out such that a fastener 74, such as a bolt, is inserted into an elongated hole 71A formed at the base member 71 in the vertical direction and the fastener 74 is screwed into a screw hole of the raising and lowering member 72, therefore, the height of the second clamping means 73 can be adjusted by raising or lowering the raising and lowering member 72 with the fastener 74 loosened.

A retaining member 79, as an upper clamping member of the second clamping means 73, is disposed above the clamp body 77, as a lower clamping member of the second clamping means 73. The retaining member 79 is attached to the clamp body 77 by a shaft 80 at the end on the opposite side to the article to be heat treated 10 so as to be swingable vertically. A lower end of a bending link member 81 is coupled to the clamp body 77 by a shaft 83, and a piston rod 85A of a cylinder 85, installed on the clamp body 77 by a shaft 84 so as to be swingable, is connected to an upper end of the bending link member 81 by a shaft 86. Either a hydraulic cylinder or an air cylinder may be used as the cylinder 85. A mid-portion in the longitudinal direction of the retaining portion 79 and the bending portion of the bending link member 81 are coupled by a coupling link member 87, and the connection between the retaining portion 79 and the coupling link member 87 is performed by a shaft 88, while the connection between the bending link member 81 and the coupling link member 87 is performed by a shaft 89.

Furthermore, to the second clamping means 73, a clearance securing means 90 for securing a clearance 82 required for clamping the flange portion 13 of the article to be heat treated 10 loosely is provided between the retaining member 79 and the clamp body 77. The clearance securing means 90 of the present embodiment is composed of a bolt 91 screwed downward to the clamp body 77 and a lock nut 92 locking the bolt 91 in the clamp body 77. Since a receiving portion 79A existing at the lower surface of the retaining member 79 abuts on a head portion 91A of the bolt 91, the clearance 82, wider than the thickness of the flange portion 13, is secured between the retaining member 79 and the clamp body 77 as shown in FIG. 9.

As shown in FIG. 10, when the piston rod 85A of the cylinder 85 is contracted, the retaining member 79 opens widely and pivots on the shaft 80 by the operation of the bending link member 81 and the coupling link member 87. A setting work of the article to be heat treated 10 for hardening to the clamping device 20 is conducted when the retaining member 79 opens and pivots in the above-described manner. When the piston rod 85A of the cylinder 85 is stretched, the retaining member 79 shuts and pivots to the position where it clamps the flange portion 13 loosely with the clearance 82 between the retaining member 79 and the clamp body 77. The size of the clearance 82 is the size set by the clearance securing means 90. Thus, when the flange portion 13 is clamped loosely by the second clamping means 73, the hardening operation for the article to be heat treated 10 is performed. When the retaining member 79 opens and pivots by the shortening operation of the piston rod 85A, in other words, when the clamping by the retaining member 79 is released, the article to be heat treated 10 after hardening is pulled out from the clamping device 20.

When the retaining member 79 shuts and pivots on the shaft 80 by the stretching operation of the piston rod 85A of the cylinder 85, an pivoting amount of the retaining member 79 for the same stretching amount of the piston rod 85A gradually decreases by the operation of the bending link member 81 and the coupling link member 87. The bending link member 81 and the coupling link member 87 are members for transmitting a load from the piston rod 85A to the retaining member 79 so as to increase gradually in the toggle mechanism constituting the second clamping means 73, therefore, the clamping force for clamping the flange portion 13 loosely by the retaining member 79 becomes great when the retaining member 79 presses downward the upper surface of the flange portion 13.

Accordingly, a load large enough to allow the article to be heat treated 10 to convex upward can be generated in the second clamping means 73 when the article to be heat treated 10 is set in the fixed position of the clamping device 20 by the first clamping means as the tight clamping means not shown in FIG. 9 and FIG. 10 and the second clamping means 73 in the manner as described above. Besides, by composing the first clamping means in the structure of the toggle mechanism similar to the second clamping means 73, the large load for allowing the article to be heat treated 10 to be convex upward can be generated also in the first clamping means.

Figure 11:
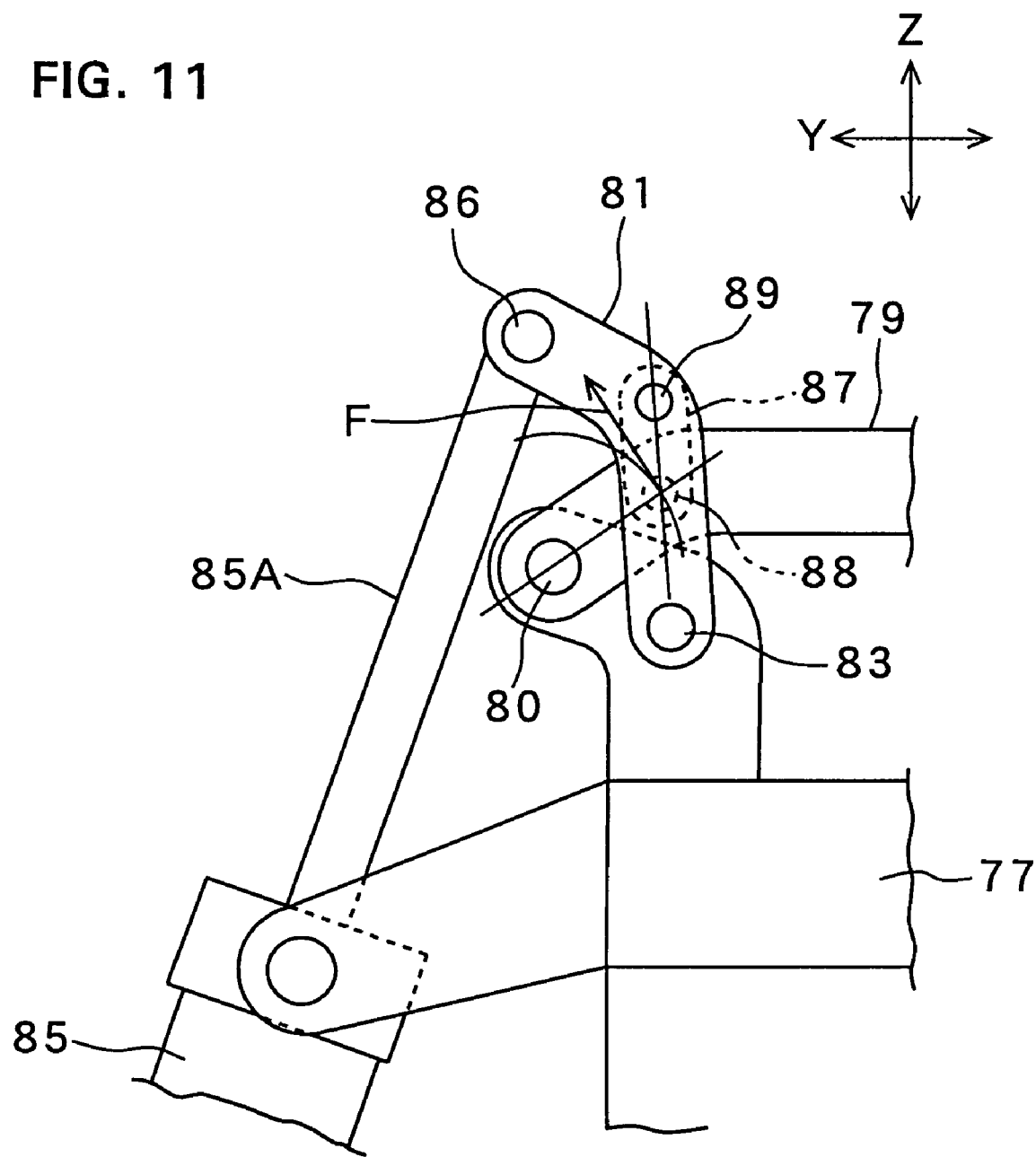
FIG. 11 is a partially enlarged view of FIG. 9.

FIG. 11 is a partially enlarged view of the second clamping means 73 when the retaining member 79 clamps the flange portion 13 loosely. When the flange portion 13 is clamped loosely with the load from the retaining member 79, an upward force F for pivoting the retaining member 79 upward upon the shaft 80 operates on the retaining member 79 as a reaction force from the flange portion 13. The upward force F is to be the force for pivoting the coupling link member 87 on the shaft 89 at the shaft 88 which is the coupling portion between the retaining member 79 and the coupling link member 87. When the retaining member 79 clamps the flange portion 13 loosely, the direction of the coupling member 87 is the direction in which the position of the shaft 89 of the upper end of the coupling link member 87 is in the side of the article to be heated 10, taking the upward force F operating on the shaft 88 as a reference direction, therefore, the coupling link member 87 does not pivot on the shaft 89 in the direction of the article to be heated 10 by the upward force F.

After the retaining member 79 clamps the flange portion 13 loosely, the retaining member 79 does not open and pivot upon the shaft 80 by the reaction force from the flange portion 13, thus a loose-clamping state of the flange portion 13 by the retaining member 79 can be maintained even if the pressure of the pressurized fluid allowing the piston rod 85A of the cylinder 85 to extend is released. When the second clamping means 73 is of the manual type not using a cylinder, it is not necessary to keep on adding manual operational force to the retaining member 79 as a lever pivotably operated on the shaft 80 by manual operation after the flange portion 13 is loosely clamped by the retaining member 79.

The second clamping means 73 in the present embodiment includes the clearance securing means 90 shown in FIG. 9 and FIG. 10 for securing the clearance 82 between the retaining member 79 and the clamp body 77 when the retaining member 79 clamps the flange portion 13 loosely. Since the clearance securing means 90 is composed of the bolt 91 and lock nut 92, the size of the clearance 82 to which the flange portion is inserted can be adjusted by loosening the lock nut 92 and turning the bolt 91. Thus, the size of the clearance 82 can be adjusted to the appropriate size corresponding to the above-mentioned amount of curvature of the article to be heat treated 10, which occurs when the hardening region 14 of the article to be heat treated 10 is heated by the above-described heating device.

Furthermore, the second clamping means 73 is installed on the raising and lowering member 72 of which the height is able to be changed by the elongated hole 71A, therefore the clamping position of the second clamping means 73 for loosely clamping the flange portion 13 can be adjusted in the Z direction. Accordingly, for example, the clamping position in the first clamping means not shown for clamping tightly the flange portion 13 is made adjustable in the Z direction by the similar means to the elongated hole 71A or other means to thereby perform the hardening operation for variously shaped articles to be heat treated of which the position in the Z direction changes in the X direction by the same clamping device 20. Besides, when the article to be heat treated 10 is clamped by the first clamping means and the second clamping means 73, the above amount of curvature of the article to be heated 10 which will be necessary to prevent or reduce the occurrence of the above-described warpage of the article to be heated 10 can be adjusted.

As for the clamping position for clamping the flange portion 13 in the first clamping means and the second clamping means 73 in the Z direction, it is adjustable also by arranging a base member with the clamp body 77 installed on the upper surface thereof so as to be attachable and detachable on the work table 21 and by interposing a spacer such as shims having a different thickness between the base member and the work table 21. According to this manner, the height of the respective clamping means can be changed while securing parallelism in the horizontal direction.

Figure 12:
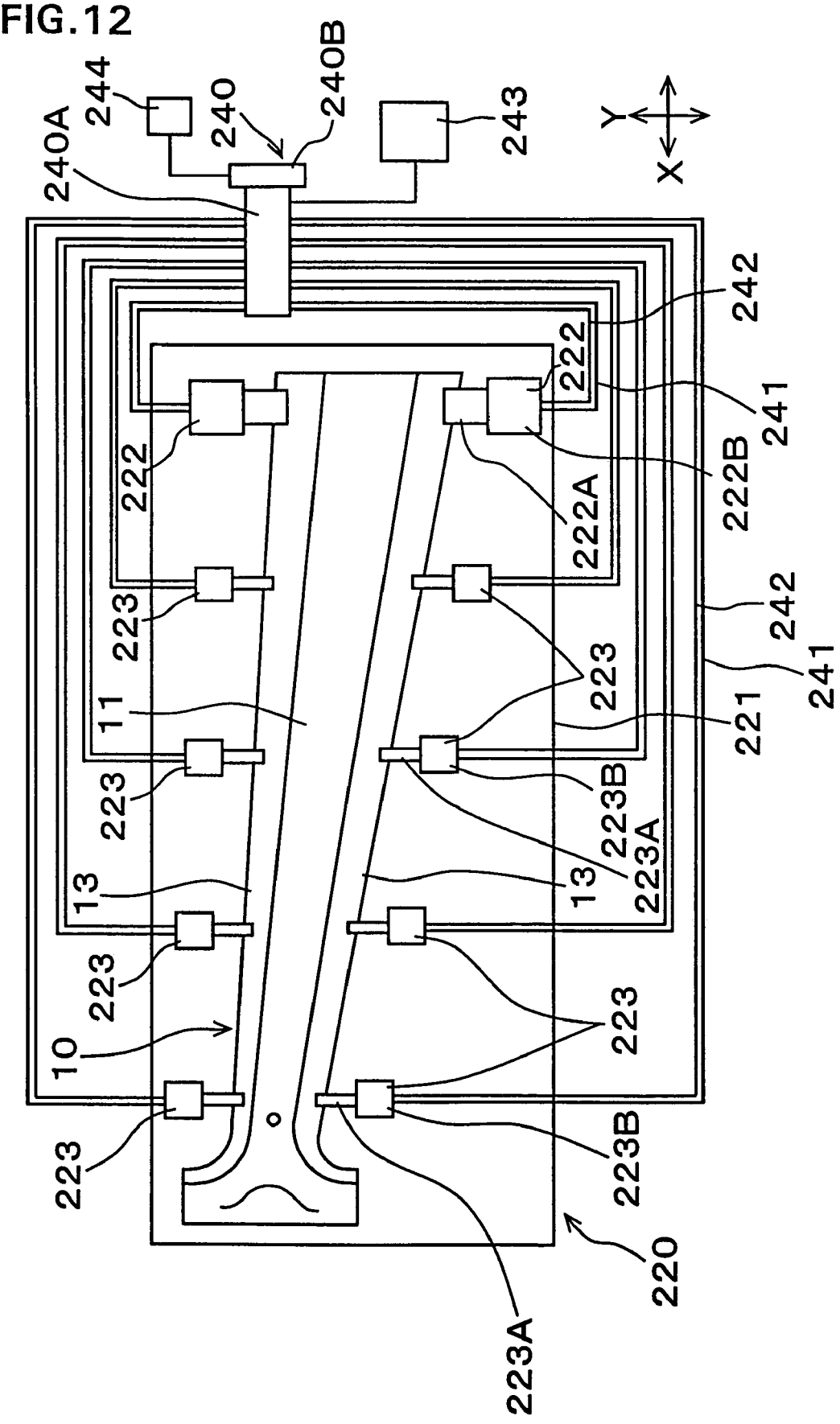
FIG. 12 is a plan view showing an embodiment in which an order of the clamping for the article to be heat treated by plural number of second clamping means as being the loose clamping means is in an order from near the first clamping means as being the tight clamping means.

FIG. 12 shows an embodiment relating to the order of clamping when the article to be heat treated 10 is clamped by a first clamping means 222 as a tight clamping means and plural second clamping means 223 as loose clamping means.

A clamping device 220 of the present embodiment is equipped with the respective clamping means 222, 223 on a work table 221 as in the same manner as the embodiments described above. The respective clamping means 222, 223 are composed of clamping portions 222A, 223A clamping the flange portion 13 as being the non-hardening region of the article to be heated 10 by an upper clamping member and a lower clamping member and driving portions 222B, 223B opening and shutting the upper clamping member for the lower clamping member as being an immovable member, and the driving portions 222B and 223B consist of air cylinders. A piston rod of the air cylinder reciprocates by the air supply and emission to the driving portions 222B and 223B to thereby perform a pivotal movement for clamping the article to be heat treated 10 by the upper clamping member as being a lever type as well as for releasing the clamping thereof. Therefore, the clamping means 222, 223 in the present embodiment are automatic clamping means.

The respective clamping means 222 and 223 are connected to a control device 240 via pairs of air supply and emission pipes 241, 242. The control device 240 is composed of an electromagnetic changeover-valve portion 240A, a relay, a timer and the like, including a control portion 240B controlling the operation of the electromagnetic changeover-valve portion 240A. Compressed air is supplied by an air compressor 243 to the electromagnetic changeover-valve portion 240A connected to the clamping means 222 and 223 via the pairs of air supply and emission pipes 241, 242. The changeover-valve portion 240A performs a changeover between the supply of compressed air to the air cylinder by one of the air supply and emission pipes 241, 242 and the emission of compressed air from the air cylinder by the other pipe in order to allow the piston rod of the air cylinder to reciprocate by every clamping means 222 or every clamping means 223. The changeover by the changeover-valve portion 240A for pivoting to shut the upper clamping members of the clamping portions 222A, 223A for the lower clamping members, in other words, operation of the changeover-valve portion 240A for allowing the clamping portions 222A, 223A to clamp the article to be heated 10 is performed with the time difference between the first clamping means 222 and the second clamping means 223, as well as between respective plural second clamping means 223 themselves arranged in the X direction, according to the order set by the timer of the control portion 240B.

Specifically, after the article to be heat treated 10 is put on the lower clamping members as being the immovable members of the respective clamping means 222, 223, a signal of starting operation is inputted from a operational device 244 to the control portion 240B of the control device 240. Then, according to the signal from the timer of the control portion 240B, the changeover-valve portion 240A at first allows first clamping means 222 to clamp the article to be heated 10, next, allows the second clamping means 223 to clamp the article to be heat treated 10, which is nearest to the first clamping means 222 among the plural second clamping means 223 provided in the X direction, after that, allows the second clamping means 223 near to the first clamping means 222 in the second place to clamp the article to be heated 10. Accordingly, the article to be heated 10 is clamped by the plural second clamping means 223 in accordance with the order near to the first clamping means 222.

When the article to be heat treated 10 is clamped by all clamping means 222, 223, the article to be heat treated 10 receives a load whereby the article to be heat treated 10 curves to be upwardly convex in the raising direction of the raised portion 11 from these clamping means 222, 223 as in the above-described embodiments. After the article to be heated 10 is clamped by all the clamping means 222, 223, the hardening region of the article to be heated 10 is heated from an obverse side by an induction-heating type heating device with high-frequency current not shown in FIG. 12. Subsequently, the hardening region is quenched from a reverse side of the article to be heat treated 10 by coolant ejected from a coolant circulating pipe.

When the predetermined period of time set by the timer of the control portion 240B of the control device 240 passes, that is to say, when the predetermined period of time passes after the signal of starting operation is inputted from the above operational device 244 to the control portion 240B, the changeover-valve portion 240A performs an operation for allowing all the clamping means 222, 223 to release the clamping of the article to be heat treated 10 by the signal from the control portion 240B to thereby release the clamping of the article to be heated 10.

According to this embodiment, after the first clamping means 222 as the tight clamping means clamps the article to be heat treated 10, the plural second clamping means 223 arranged in the X direction as being the longitudinal direction of the article to be heated 10 clamp the article to be heat treated 10 sequentially in accordance with the order near to the first clamping means 222, therefore the operation for giving the load allowing the article to be heat treated 10 to be convex in the raised direction of the raised portion 11 from the respective clamping means 222, 223 to the article to be heat treated 10 can be conducted smoothly without a unreasonable load.

In the present embodiment, though the first clamping means 222 is also controlled by the control device 240, the first clamping means 222 may be a manual-type clamping means, and the clamping means of which the order of clamping the article to be heat treated 10 are controlled by the control device may be limited to the second clamping means. However, if the first clamping means is also controlled by the control device, the operation for giving the load allowing the article to be heat treated 10 to be convex without the unreasonable load as described above can be performed automatically.

FIGS. 13 to 17 show an embodiment of a clamping device 100 constituted such that an upper clamping member and a lower clamping member of a first clamping means and a second clamping means are provided to different members respectively and clamping of the article to be heat treated 10 is performed or released automatically by raising or lowering the lower clamping member toward the upper clamping member.

Figure 13:
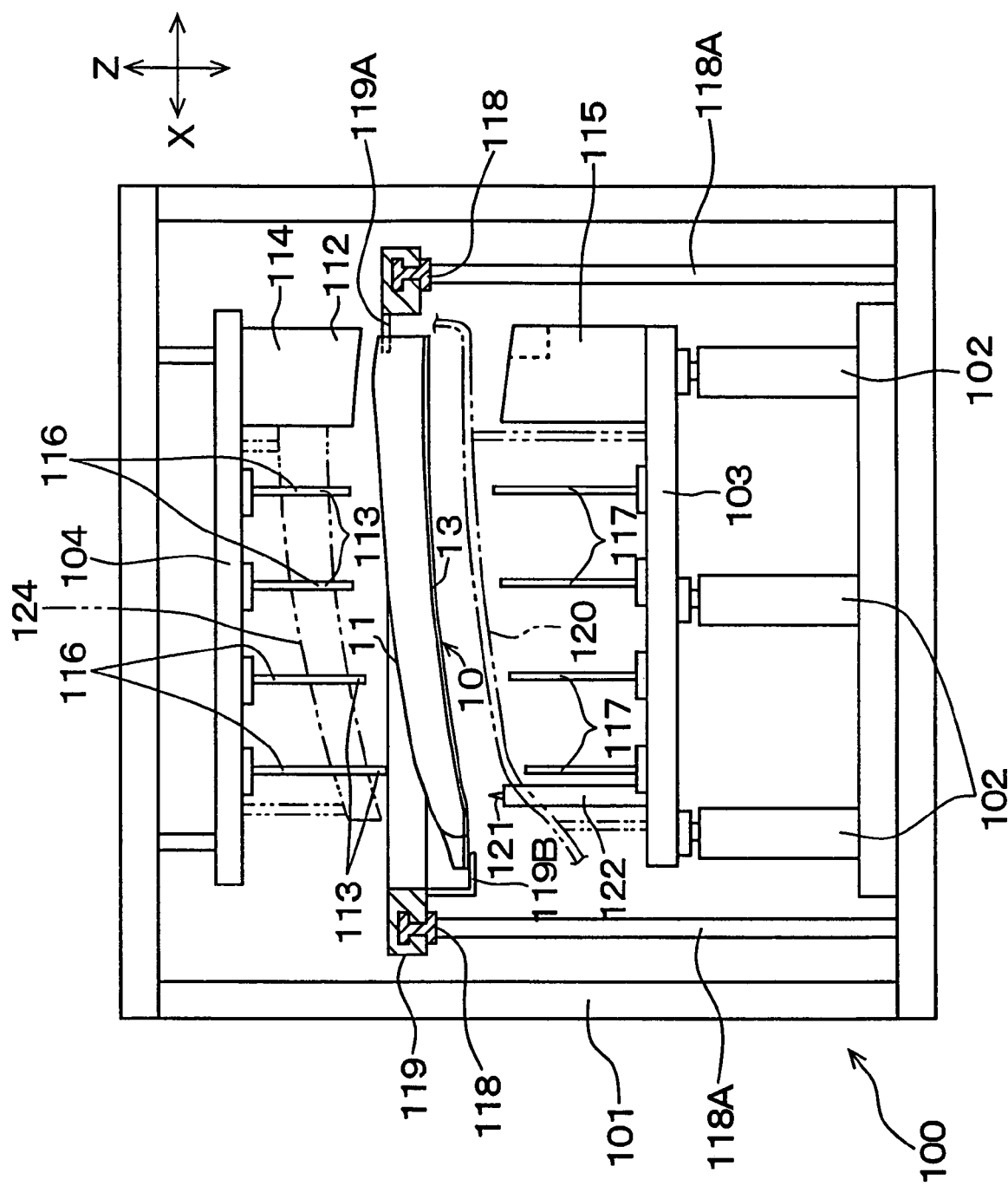
FIG. 13 is a front view showing a clamping device of an embodiment in which upper and lower clamping members of the first and second clamping means are arranged separately into a raising and lowering member and an immovable member.

As shown in FIG. 13, the clamping device 100 according to the present embodiment includes a frame body 101 formed with a combination of a column, a horizontal beam and the like, a raising and lowering member 103 attached to a hydraulic cylinder 102 installed upward on the frame body 101, and an immovable member 104 joined to the frame body 101 just above the raising and lowering member 103. An upper clamping member 114 and a lower clamping member 115 formed respectively in block shape of a first clamping means 112 are installed separately into the immovable member 104 and the raising and lowering member 103, while an upper clamping member 116 and a lower clamping means 117 of a second clamping means 113 formed respectively in plate shape are installed separately into the immovable member 104 and the raising and lowering member 103. The article to be heat treated 10 is put on receiving portions 119A, 119B provided on a traveling unit 119 traveling on and guided by a rail 118. When the traveling unit 119 travels to the position where the raising and lowering portion 103 and the immovable portion 104 are arranged and stops there, guided by the rail 118 installed at a high position by a support post 118A, the raising and lowering member 103 begins to raise by the hydraulic cylinder 102 as shown in FIG. 14.

Figure 14:
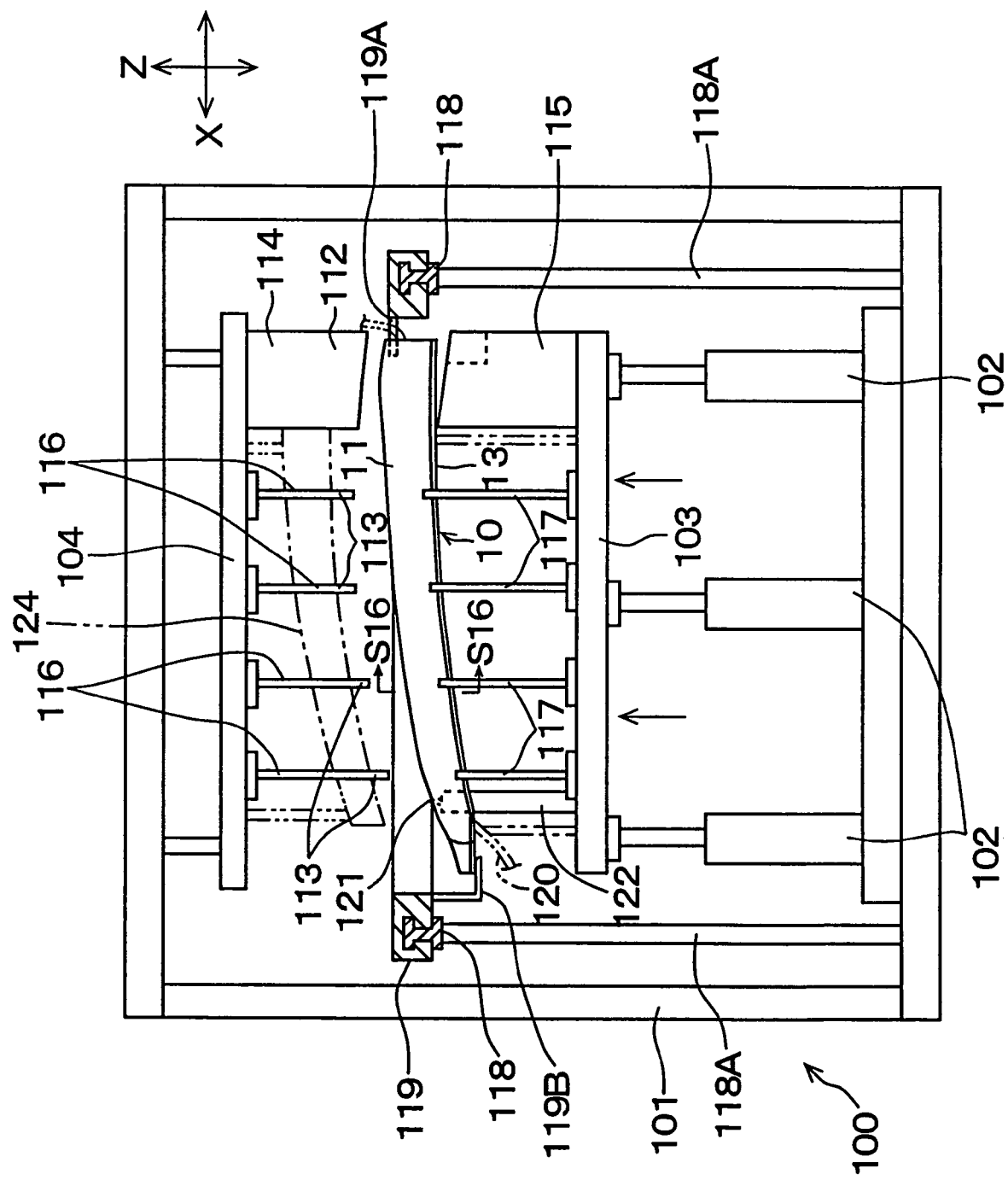
FIG. 14 is a front view showing a state in which the raising and lowering member is on the way of being raised in the clamping device in FIG. 13.
Figure 16:
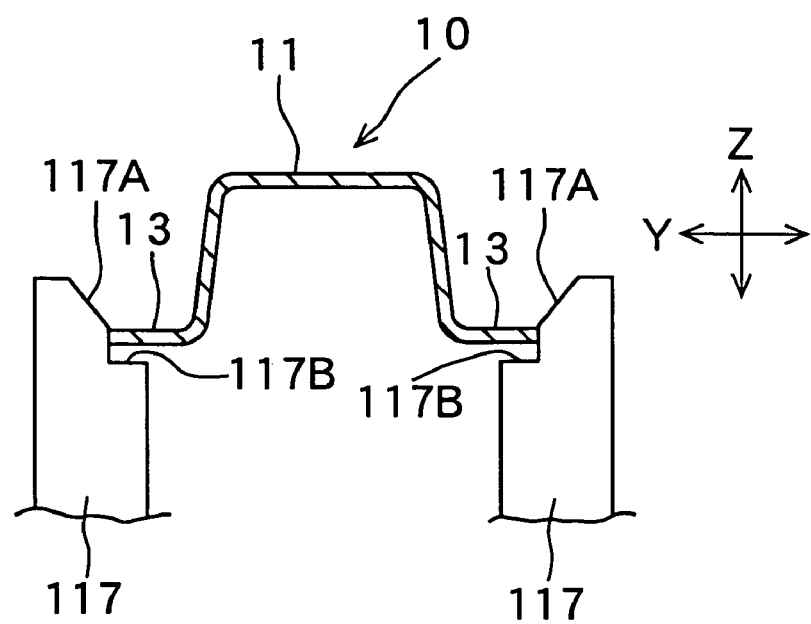
FIG. 16 is a cross-sectional view taken along the line S16-S16 in FIG. 14.

FIG. 16 is a cross-sectional view taken along the line S16-S16 in FIG. 14. As shown in FIG. 16, a guide portion 117A extending inside of the Y direction as it extends downward is formed on the upper portion of the lower clamping member 117 of the second clamping means 113, and there provided a concave portion 117B below the guide portion 117A. Thus, when the lower clamping member 117 is raised by the raising and lowering member 103, the flange portion 13 of the article to be heat treated 10 put on the receiving portions 119A, 119B of the traveling body 119 descends to the concave portion 117B, being positioned in the Y direction with respect to the lower clamping member 117 provided side by side in the Y direction by guiding operation of the guide portion 117A.

Consequently, the article to be heat treated 10 is placed on the respective lower clamping members 115, 117 of the first clamping means 112 and the second clamping means 113, and the placement of the article to be heated 10 transferred from the receiving portion 119A, 119B of the traveling body 119 to the lower clamping members 115, 117 is conducted while the lower clamping members 115, 117 are on the way of being raised by the raising and lowering member 103.

When the article to be heated 10 is placed on the lower clamping members 115, 117, a coolant circulating pipe 120 as a cooling device attached to the raising and lowering member 103 shown in FIG. 13 enters into the raised portion 11 from the reverse side of the article to be heat treated 10 as shown in FIG. 14. Since a positioning pin 121 having a tapered-shape is fitted upward on the raising and lowering member 103 via a support post 122 as shown in FIG. 13, the positioning pin 121 is inserted to a hole 10A formed in the article to be heated 10, which is required for the article to be heated 10 functionally to thereby position the article to be heat treated 10 in the X direction as shown in FIG. 2 and FIG. 3.

Figure 15:
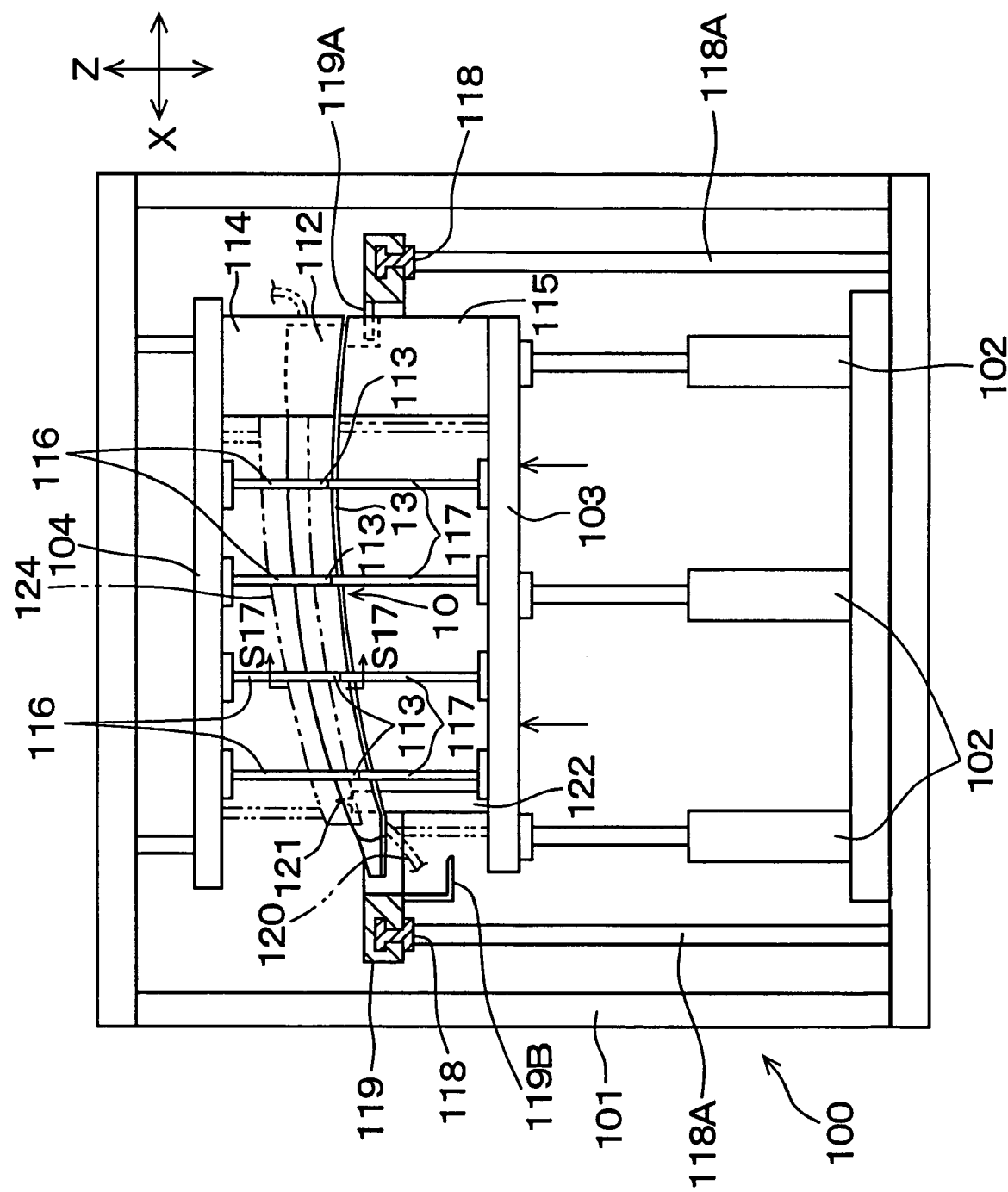
FIG. 15 is a front view showing a state in which the article to be heat treated is clamped by the first clamping means and the second clamping means in the clamping device in FIG. 13 when the raising and lowering member reaches the highest position.
Figure 17:
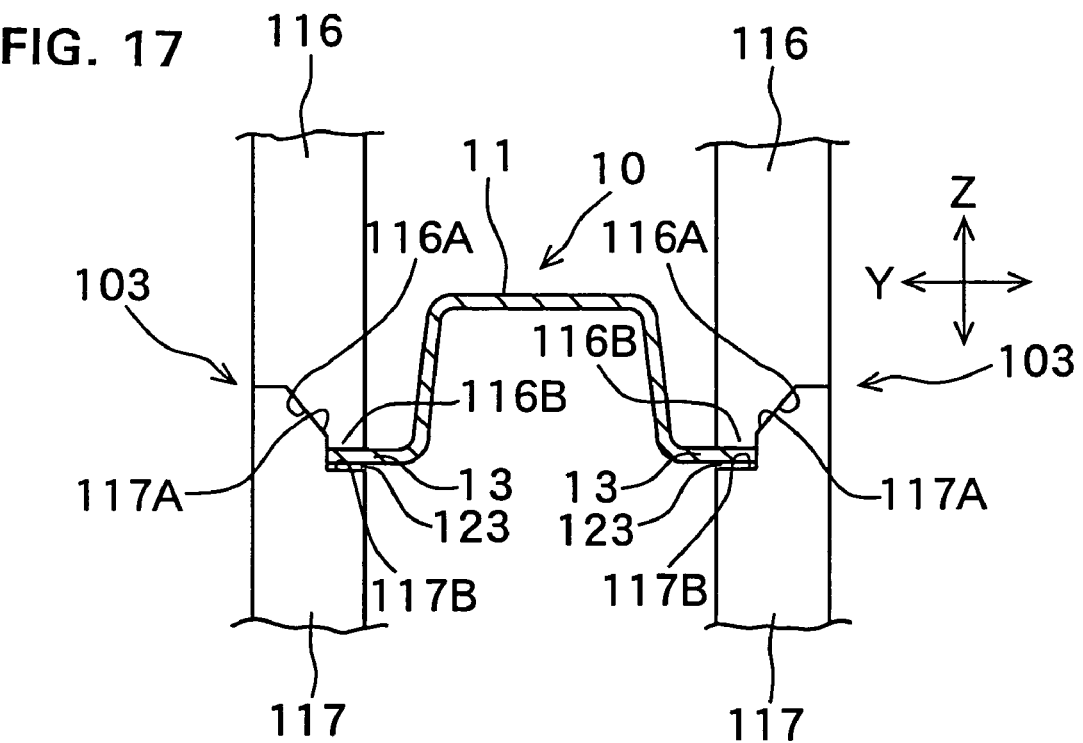
FIG. 17 is a cross-sectional view taken along the line S17-S17 in FIG. 15.

After that, the raising and lowering member 103 is raised further, as shown in FIG. 17 which is a cross sectional view taking along S17-S17 line of FIG. 15 showing the state the raising and lowering member 103 reaches the highest position, an inclined portion 116A formed at the lower portion of the upper clamping member 116 of the second clamping means 113 engages with the guide portion 117A of the lower clamping member 117 to thereby allow the upper and lower clamping members 116, 117 to be positioned in the Y direction, and the flange portion 13 is held tightly by the upper and lower clamping members 114, 115 of the first clamping means 112 as shown in FIG. 15, while the flange portion 13 is clamped loosely by the upper and lower clamping members 116, 117 of the second clamping means 113 as shown in FIG. 17. The loose clamping is performed in such a state that, when a protruding portion 116B provided to be protruded at the lower portion of the inclined portion 116A of the upper clamping member 116 is inserted to the concave portion 117B of the lower clamping member 117, a clearance 123 wider than the thickness of the flange portion 13 is formed between a tip surface of the protruding portion 116B and a bottom surface of the concave portion 117B.

When the flange portion 13 is clamped by the first clamping means 112 and the second clamping means 113, a load for allow the article to be heat treated 10 to be convex in the raised direction of the raised portion 11 is given to the flange portion 13 by the clamping means 112, 113 as in the same manner as the clamping device 20 in the embodiment shown in FIG. 3 to FIG. 6.

In the present embodiment, the load for allowing the article to be heated 10 to be convex is adjusted by interposing shims having different thicknesses between the raising and the lower member 103 and the lower clamping members 115, 117 of the first clamping means 112 and the second clamping means 113 or between the immovable member 104 and the upper clamping members 114, 116 of the first clamping means 112 and the second clamping means 113.

When the article to be heat treated 10 is clamped by the first clamping means 112 and the second clamping means 113 as described above, a heating device 124 provided to the immovable means 104 is set above the article to be heated 10. The hardening region 14 of the article to be heated 10 is heated by induction heating using a high-frequency current by the heating device 124, and the article to be heated 10 is quenched by the coolant ejected from the coolant circulating pipe 120.

After the hardening operation of the hardening region 14 is thus finished, the raising and lowering member 103 is lowered by the hydraulic cylinder 102 and the article to be heat treated 10 is transferred to the receiving portions 119A, 119B of the traveling unit 119 on the way of the lowering. Subsequently, the article to be heat treated 10 is sent to a next process such as a painting process by the traveling of the traveling unit 119.

According to the clamping device 100 of the present embodiment, the operation carrying the article to be heat treated 10 in the position where the article is clamped by the first clamping means 112 and the second clamping means 113 and the operation carrying the article to be heated 10 of which the hardening operation is finished out to the next process can be performed as an automatic operation by the traveling of the traveling unit 119, as a result, workability is improved.

Furthermore, according to the clamping device 100 of the present embodiment, the heating device 124 is installed to the immovable member 104 which does not raise or lower, therefore, the clamping device 100 may have the structure that the large-scaled heating device 124 itself and electric cables and the like connecting the heating device 124 with a power supply device are not raised or lowered, resulting in the whole structure of the clamping device 100 being simplified.

Figure 18:
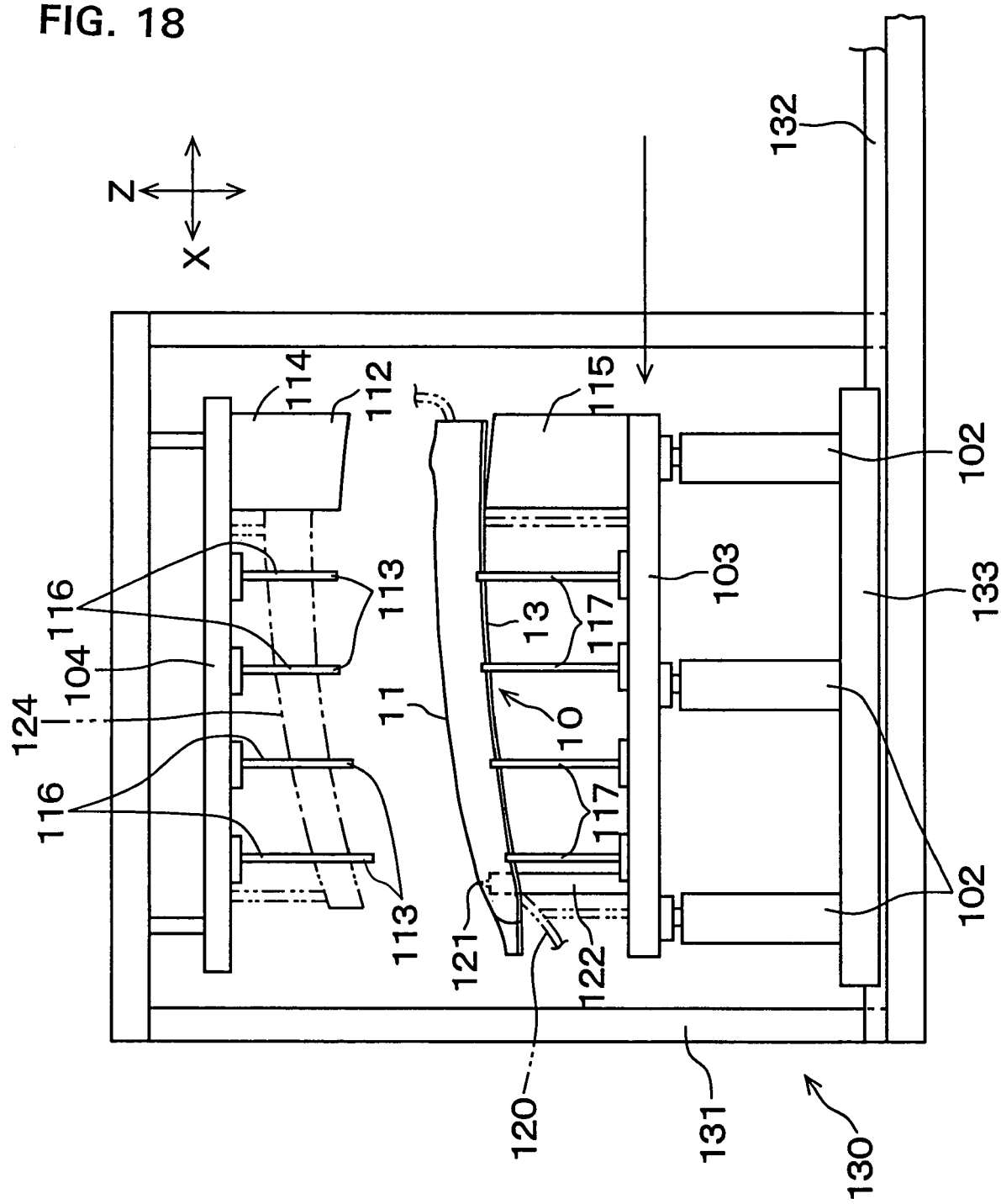
FIG. 18 is a front view showing a clamping device of an embodiment in which the article to be heat treated is placed on the lower clamping member of the first clamping means and the second clamping means before the raising and lowering member begins to be raised, as being a view showing a state before the raising by the raising and lowering member.
Figure 19:
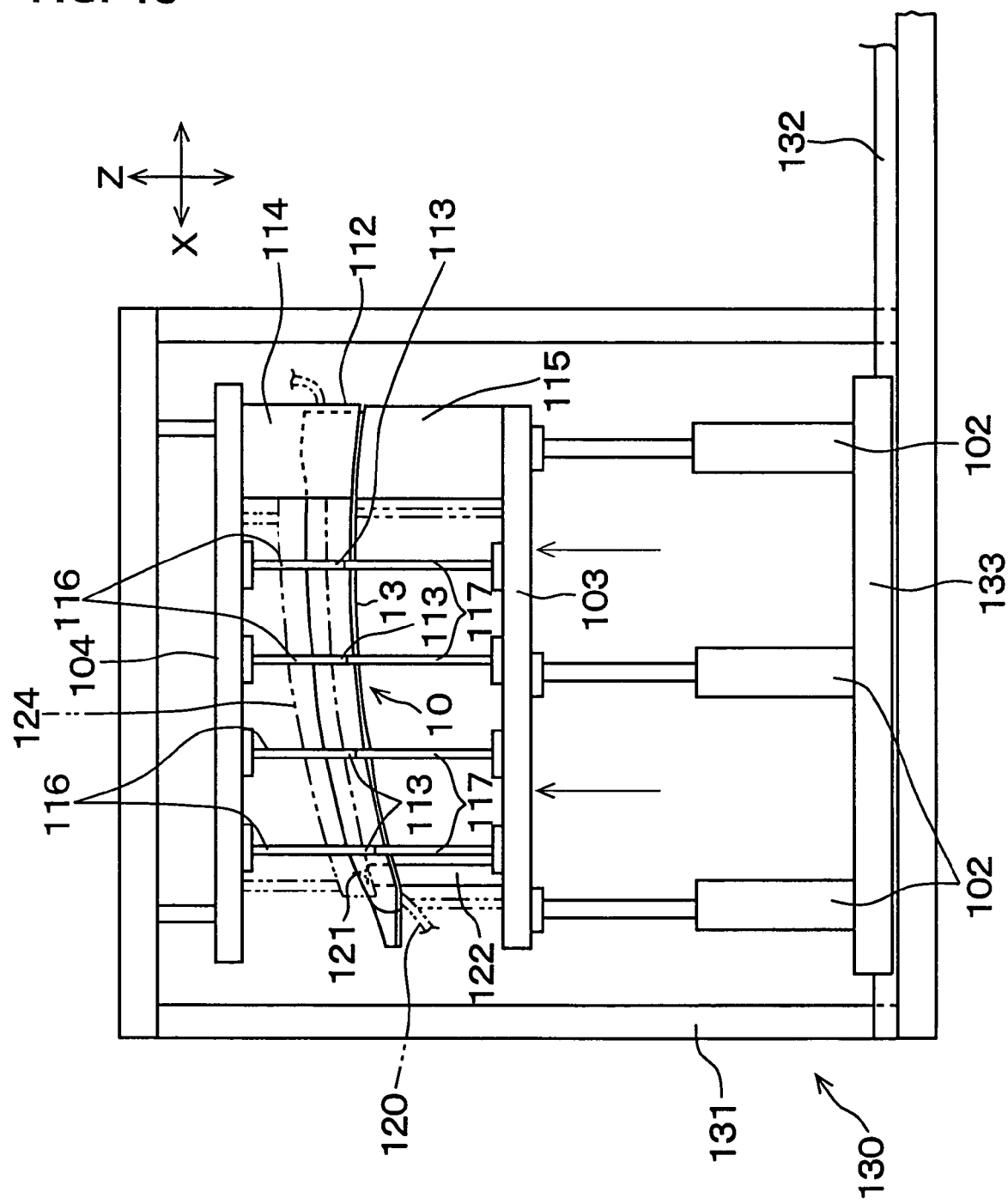
FIG. 19 is a front view showing a state in which the article to be heat treated is clamped by the first clamping means and the second clamping means after the raising and lowering member reaches the highest position.

A clamping device 130 according to embodiments shown in FIG. 18 and FIG. 19 omits the rail 118 and the traveling unit 119 in the clamping device 100 as compared with the clamping device 100 of the embodiment shown in FIG. 13 to FIG. 17, and instead, the clamping device 130 applies a traveling unit 133 traveling on and guided by a rail 132 laid on a floor portion of a frame body 131, and the hydraulic cylinder 102 for raising and lowering the raising and lowering member 103 is installed on the traveling unit 133. The structure, with the exception of these components, is the same as the structure of the clamping device 100.

In the clamping device 130 according to the present embodiment, when the traveling unit 133 reaches outside of the frame body 131, the article to be heat treated 10 is placed on the lower clamping members 115, 117 of the first clamping means 112 and the second clamping means 113. After the raising and lowering member 103 reaches just below the immovable member 104 by the traveling of the traveling unit 133 as shown in FIG. 18, the raising and lowering member 103 is raised to the highest position by the hydraulic cylinder 102 as shown FIG. 19. The flange portion 13 of the article to be heat treated 10 is thereby clamped by the first clamping means 112 and the second clamping means 113.

In the present embodiment, the article to be heat treated 10 is placed on the lower clamping members 115, 117 before the raising and lowering member 103 and the lower clamping members 115, 117 begin to be raised by the hydraulic cylinder 102. According to the present embodiment, at the height while the raising and lowering member 103 is on the way of being raised, the complicated structure such that the traveling unit 119 having the receiving portions 119A, 119B whereon the article to be heated 10 is placed stands by is not necessary and different from the embodiments shown in FIG. 13 to FIG. 17, as a result, the whole structure of the clamping device 130 can be simplified.

Figure 20:
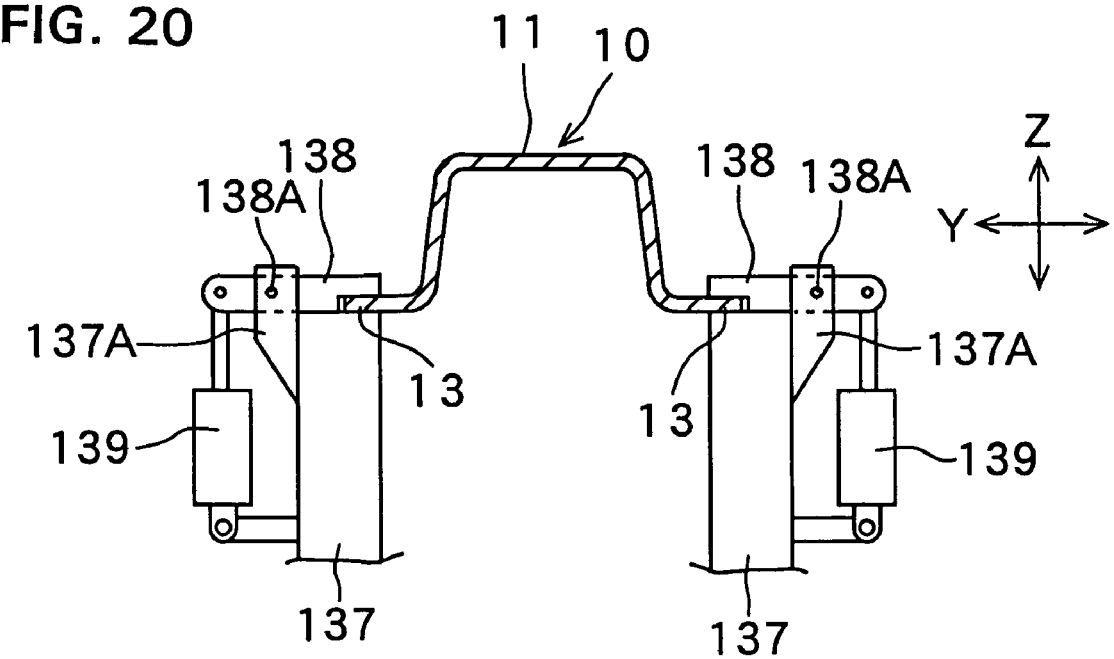
FIG. 20 is a view showing another embodiment in the case where the upper and lower clamping members of the first clamping means and the second clamping means are arranged separately into the raising and lowering member and the immovable member, as being a view of a state before the reach to the highest position by the raising and lowering member.
Figure 21:
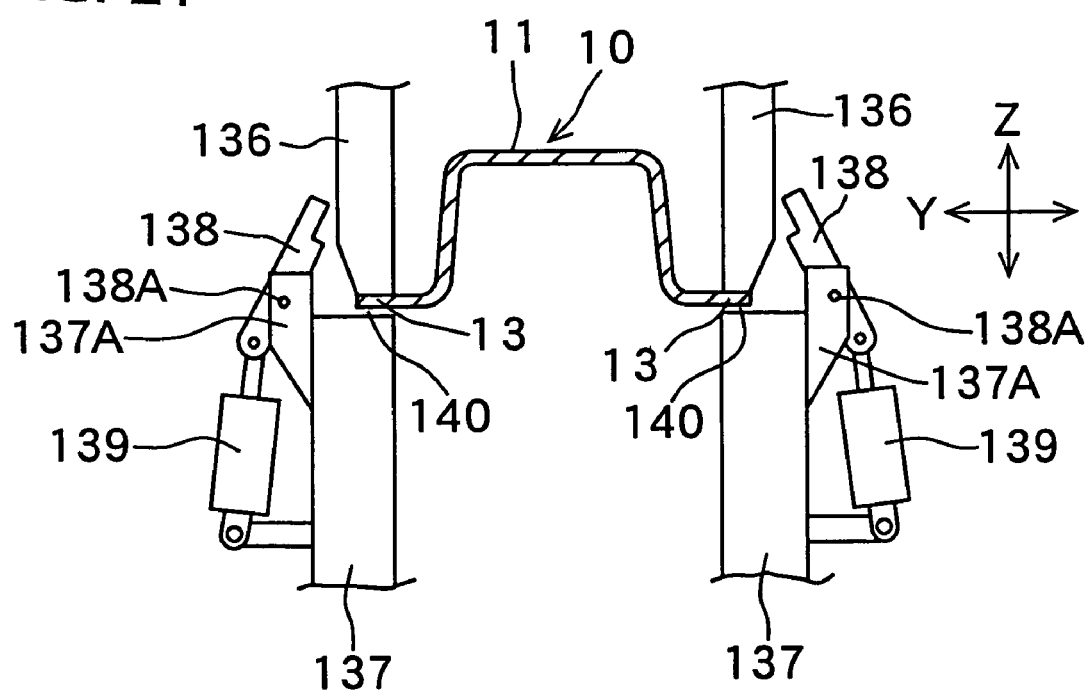
FIG. 21 is a view showing a state when the raising and lowering member reaches the highest position in the embodiment in FIG. 20.

FIG. 20 and FIG. 21 show another embodiment in the case that the upper clamping member and the lower clamping member of the first and second clamping means are installed separately onto the immovable member and the raising and lowering member as in the embodiments shown in FIG. 13 to FIG. 17 and the embodiments shown in FIG. 18 and FIG. 19.

As shown in FIG. 20, a retaining member 138 is attached to a bracket 137A provided on a lower clamping member 137 so as to be swingable vertically around a shaft 138A, and a hydraulic cylinder 139 is connected to the retaining member 138. Thus, the placement of the article to be heat treated 10 on the lower clamping member 137 arranged on the raising and lowering member, not shown, is conducted by holding tightly the flange portion 13 of the article to be heat treated 10 with the lower clamping member 137 and the retaining member 138 as shown in FIG. 20.

An upper clamping member 136 shown in FIG. 21 is installed on an immovable member not shown, shifted in the X direction with respect to the retaining member 138. When the raising and lowering member is raised to the highest position, the lower surface of the upper clamping member 136 abuts the flange portion 13, as shown in FIG. 21, then the retaining member 138 swings upward around a shaft 138A by a hydraulic cylinder 139 to release the tight holding of the flange portion 13. Consequently, the flange portion 13 is clamped by the upper clamping member 136 and the lower clamping member 137.

Since the upper and lower clamping members 136, and 137 shown in FIG. 20 and FIG. 21 are members of the second clamping means clamping the flange portion 13 loosely, when the flange portion 13 is clamped, a clearance 140 wider than the thickness of the flange portion 13 is formed between the lower surface of the upper clamping member 136 and the upper surface of the lower clamping member 137.

According to the present embodiment, the retaining member 138 retains reliably the flange portion 13 on the lower clamping member 137 until the article to be heat treated 10 is clamped by the upper clamping member 136 and the lower clamping member 137.

As shown in FIG. 20, the provision of the retaining member 138 moving swingably by the hydraulic cylinder 139 on the lower clamping member 137 can be applied to the first clamping means, and can be applied to either the first clamping means or the second clamping means.

Figure 22:
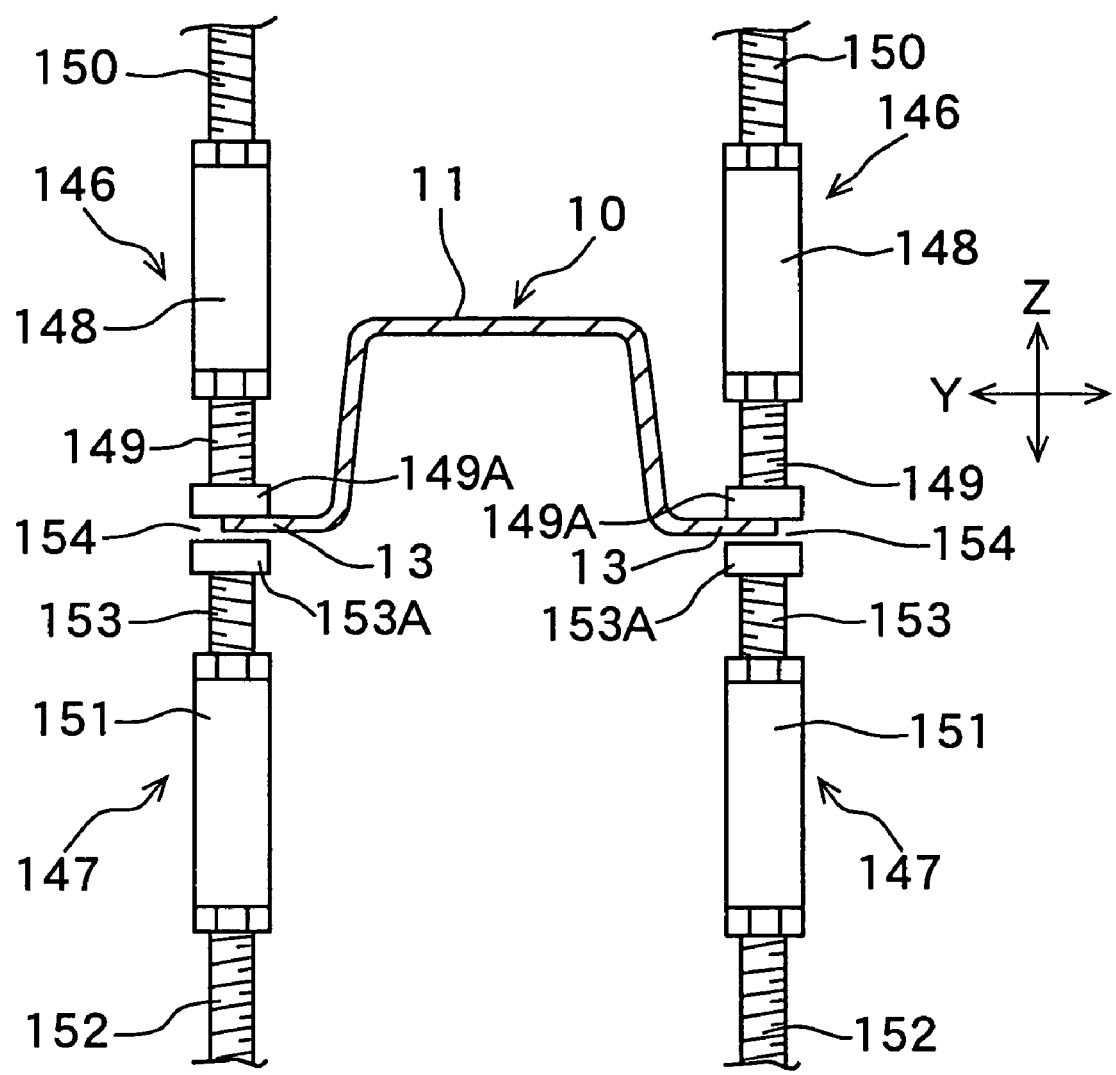
FIG. 22 is a view showing an embodiment in which the position of a loose clamp by the upper clamping member and the lower clamping member of the second clamping means can be adjusted in a height direction by a turnbuckle type adjusting means.

FIG. 22 shows an embodiment such that, when the upper clamping member and the lower clamping member of the second clamping means, as the loose clamping means, are arranged separately on the immovable member and the raising and lowering member, the loose-clamp position by the upper clamping member and the lower clamping member can be adjusted in the Z direction by a turnbuckle mechanism.

An upper clamping member 146 is composed of a right screw shaft 149 and a left screw shaft 150 connected by a long nut 148, while a lower clamping means 147 is composed of a right screw shaft 152 and a left screw shaft 153 connected by a long nut 151. The lower clamping member 147 is installed on a raising and lowering member, not shown, and the flange portion 13 of the article to be heat treated 10 is placed on a receiving portion 153A formed at an upper end of the left screw shaft 153 of the lower clamping member 147. When the lower clamping member 147 is raised to the highest position toward the upper clamping member 146 installed on the immovable member, not shown, the flange portion 13 is clamped loosely by the receiving portion 153A and a retaining portion 149A formed at a lower end of the right screw shaft 149 of the upper clamping member 146, as shown in FIG. 22.

By rotating the long nut 148 of the upper clamping member 146 and the long nut 151 of the lower clamping member 147, with the rotation of right screw shafts 149, 152 and the left screw shafts 150, 153 being stopped, the vertical lengths of the upper clamping member 146 and the lower clamping member 147 are changed, as a result, the heights of the receiving portion 153A and the retaining portion 149A are changed, thereby, the position in the Z direction where the flange portion 13 is clamped loosely is adjusted. Thus, the amount of curvature of the article to be heat treated 10 in the raised direction of the raised portion 11 can be adjusted when the flange portion 13 is clamped by the first clamping means and the second clamping means.

The turnbuckle-type adjustment means may be applied to only one of the upper clamping member 146 and the lower clamping member 147 by allowing the highest position of the lower clamping member 147 with the raising and lowering member to be variable.

For adjustment of the lengths of the upper clamping member and the lower clamping member of the first clamping means and the second clamping means, the turnbuckle mechanism as described above can be applied. According to this mechanism, the position where the non-hardening region of the article to be heat treated is clamped in the respective clamping means can be adjusted in the Z direction, therefore, the same clamping device can be used in common for the articles to be heated having various shapes, of which the position of the non-hardening region in the Z direction varies in the X direction, as a result, the clamping device has general versatility.

The length adjustment means in the Z direction by the above-described turnbuckle mechanism may be applied for adjusting at least one member of the upper clamping member and the lower clamping member in the second clamping means as the loose clamping means having various structures. According to this means, the size of the clearance to which the non-hardening region of the article to be heat treated is interposed in the loose clamping means can be adjusted, as a result, the size of the clearance for the amount of curvature of the article to be heat treated to the side of the hardening region when the hardening region is heated can be set appropriately, and various kinds of articles to be heated having different amount of curvature can be dealt with.

Figure 23:
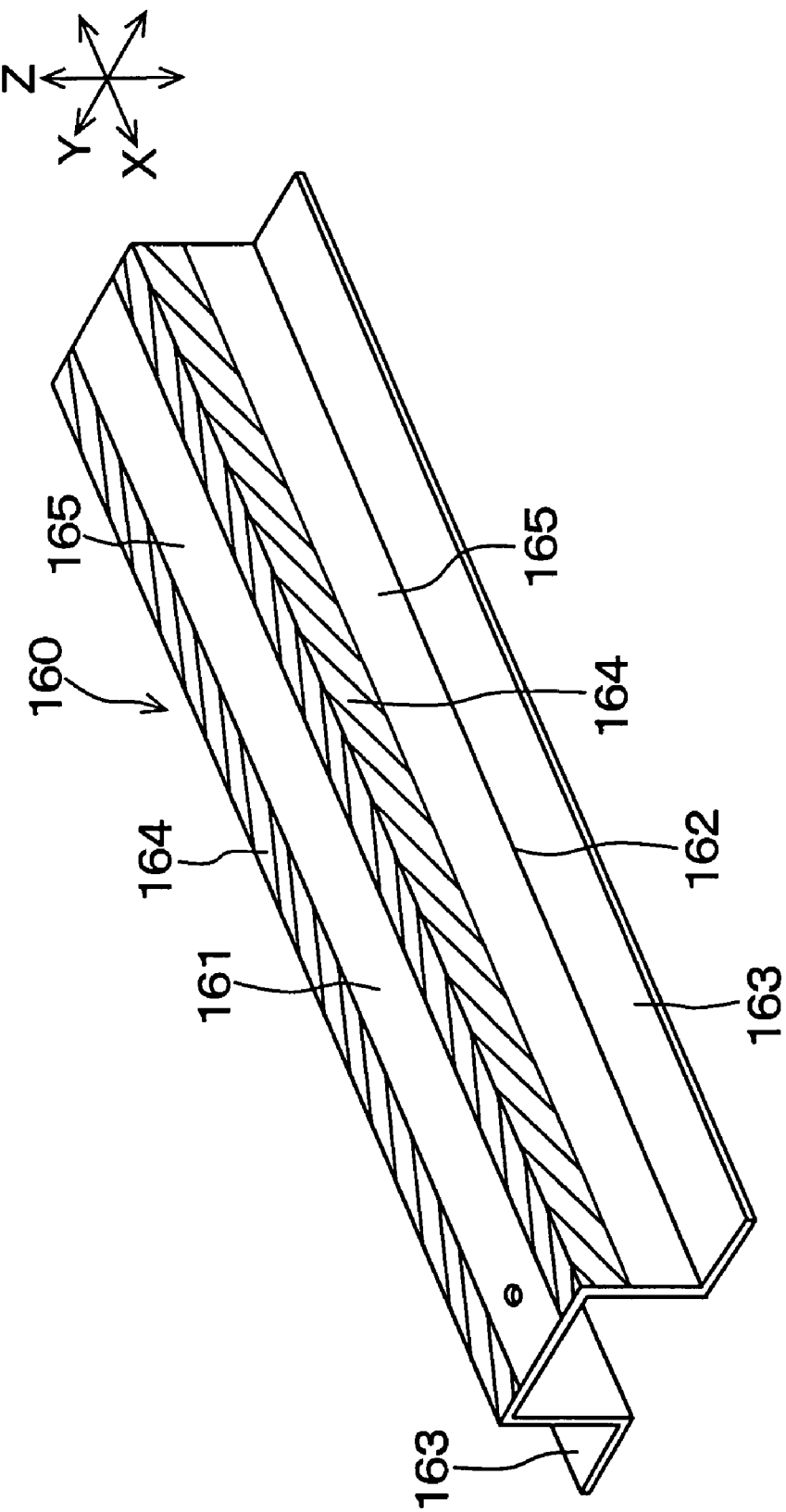
FIG. 23 is a perspective view showing the whole of the article to be heat treated clamped by a clamping device including a suppressing means against the occurrence of warpage in the width direction of the article to be heat treated.
Figure 24:
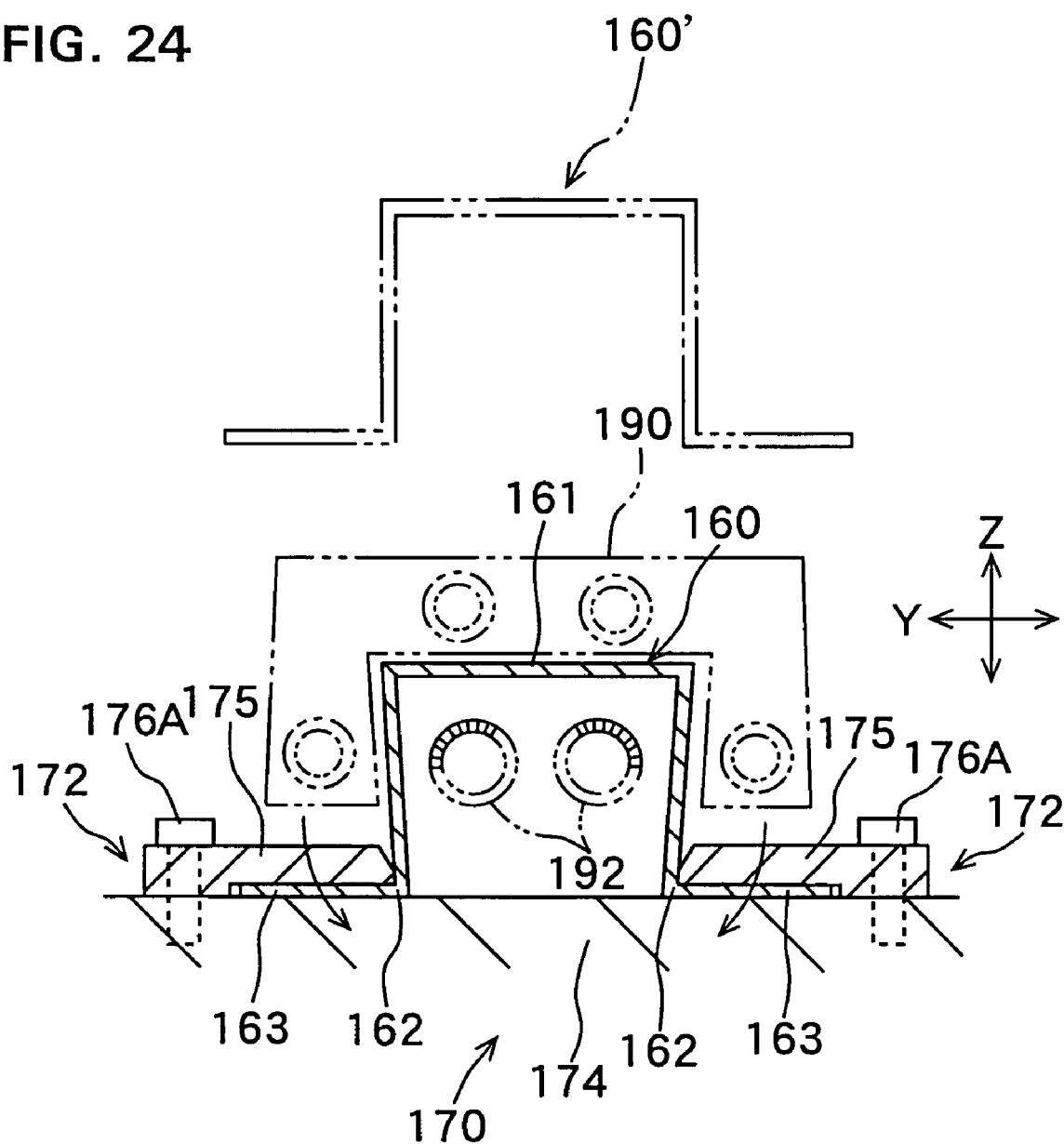
FIG. 24 is a similar view to FIG. 5 showing the first clamping means of the clamping device for clamping the article to be heat treated in FIG. 23.
Figure 25:
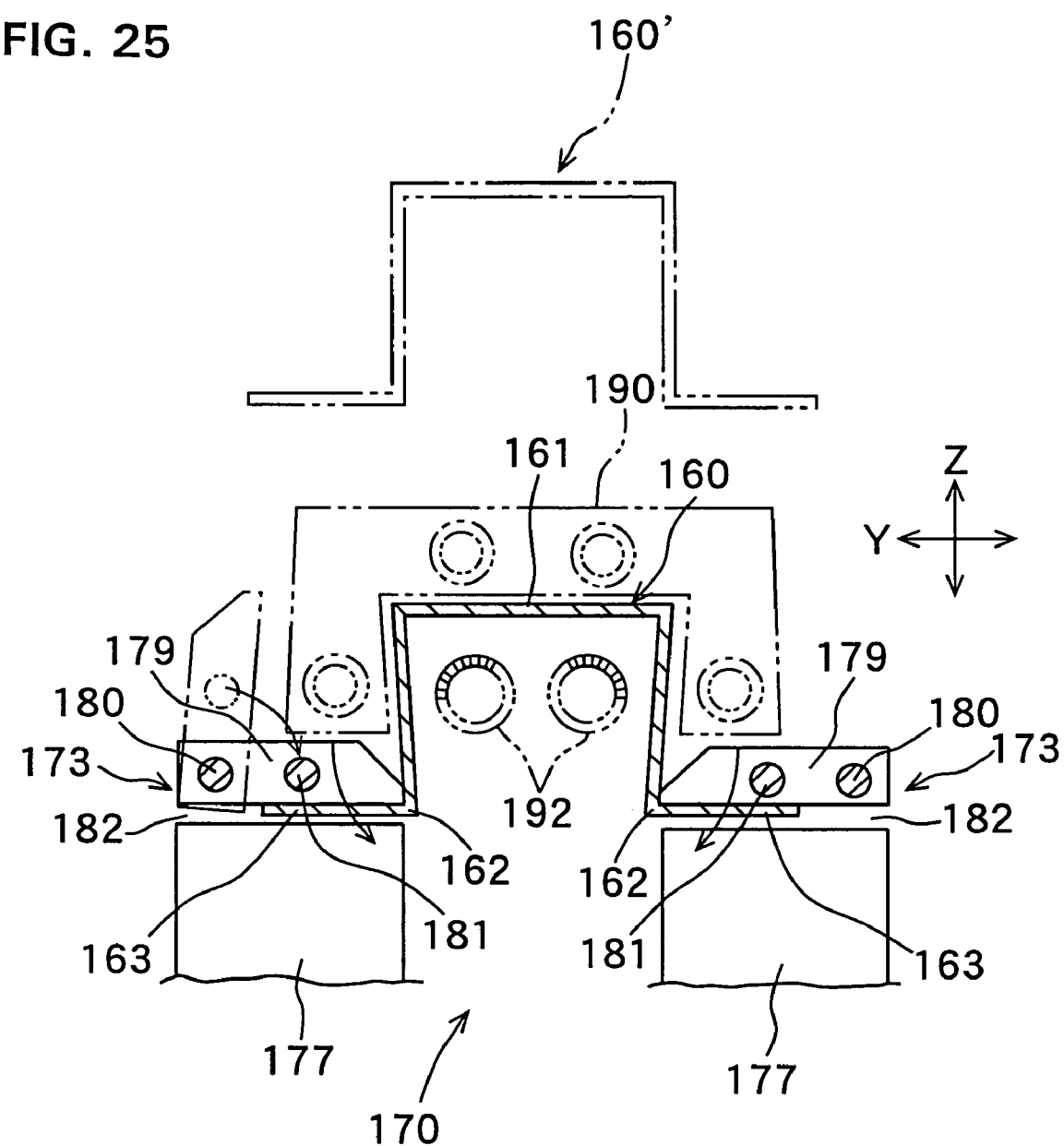
FIG. 25 is a similar view to FIG. 6 showing the second clamping means of the clamping device for clamping the article to be heat treated in FIG. 23.

FIG. 24 and FIG. 25 show a clamping device 170 according to an embodiment for preventing or reducing the occurrence of warpage in the Y direction of an article to be heat treated 160 caused when the hardening regions 164 are quenched from the reverse side of the article to be heat treated 160 after the hardening regions 164 of the article to be heat treated 160 shown in FIG. 23 are heated.

As shown in FIG. 23, the article to be heat treated 160, a press-formed article made of a steel sheet, includes a length extending in the X direction, which is the longitudinal direction, similar to the article to be heat treated 10 in FIG. 2, as well as includes a three-dimensional shape with a raised portion 161 raised in the Z direction orthogonal to the X direction and the Y direction and is provided at the middle of the Y direction as a width direction orthogonal to the X direction, and the article also has two flange portions 163 extending outside in the Y direction from the raised portion base ends 162 on both sides in the Y direction in the raised portion.

The raised portion 161 extends in the X direction continuously and the raised portion 161 in the Y direction has the same dimension throughout in the X direction, different from the raised portion 11 in FIG. 2. Two hardening regions 164 of the article to be heat treated 160 are defined at parts of the raised portion 161 in the Y direction, similar to the hardening regions 14 in FIG. 2, and the hardening regions 164 and non-hardening regions 165 extending in the X direction respectively are provided side by side in the Y direction.

FIG. 24 shows a first clamping means 172 as a tight clamping means holding fixedly one end portion in the X direction of the flange portion 163, which is the non-hardening region 165, in the clamping device 170. FIG. 25 shows a second clamping means 173 being a loose clamping means provided from the first clamping means 172 toward the other end along the X direction. The number of the first clamping means 172 provided respectively for the two flange portions 163 is one in each X direction, and the number of the second clamping means 173 in each X direction is plural. These second clamping means 173 are separated from each other in the X direction.

A basic structure of the first clamping means 172 and the second clamping means 173 are the same as the those of the first clamping means 22 and the second clamping means 23 explained in FIGS. 5 and 6.

Namely, as shown in FIG. 24, the first clamping means 172 is composed of a clamp body 174 and a retaining member 175 fastened by a detachable fastener 176 on an upper surface of the clamp body 174, and the flange portion 163 is held tightly by the clamp body 174 and the retaining member 175. As shown in FIG. 25, the second clamping means 173 is composed of a clamp body 177 and a retaining member 179 coupled to the clamp body 177 via a connecting member. The retaining member 179 is swingable in the vertical direction with respect to the coupling member around a shaft 180, and faces the clamp body 177 vertically with a clearance 182 wider than the thickness of the flange portion 163 by fitting holes formed at the retaining member 179 and the connecting member with each other, and by inserting a pin 181 into these holes.

The retaining member 175 of the first clamping means 172 shown in FIG. 24 has enough length to reach the raised portion base end 162 of the article to be heat treated 160, while the retaining member 179 of the second clamping means 173 shown in FIG. 25 also has enough length to reach the raised portion base end 162 of the article to be heat treated 160. Therefore, as shown in FIG. 24 and FIG. 25, when the flange portion 163 is clamped by the first clamping means 172 and the second clamping means 173, the two raised portion base ends 162 of the article to be heat treated 160, on both sides in the Y direction, are pressed and displaced inward in the Y direction, as compared with the article to be heat treated 160' in a natural, unloaded state by the two-dot chain line shown in FIG. 24 and FIG. 25.

The direction of pressed displacement of the two raised portion base ends 162 by the load from the retaining members 175, 179 is toward inside the raised portion 161 out of inside and outside of the raised portion 161 where a coolant circulating pipe 192 as a cooling device is arranged.

For the hardening operation, the hardening region 164 of the article to be heat treated 160 is heated by a heating device 190 to a high temperature uniformly or substantially uniformly over the whole thickness of the article to be heated 160 at the hardening region 164. After that, when a reverse thickness portion within the thickness of the article to be heated 160 is quenched by the coolant ejected from the coolant circulating pipe 192 arranged inside the raised portion 161, naturally, warpage in the Y direction for spreading the width of the opening of the raised portion 161 occurs in the article to be heat treated 160 due to the compressive yield caused at the obverse thickness portion as described above.

However, the hardening operation is performed with the two raised portion base ends 162 being pressed and displaced in the reverse side of the warpage in the present embodiment, therefore the occurrence of warpage in the Y direction at the article to be heat treated 160 at the time when the clamping by the clamping device 170 is released can be prevented or reduced.

In such a suppressing means against the occurrence of warpage in the Y direction, tips of the retaining members 175, 179 press and displace the raised portion base end 162 of the article to be heat treated 160 inside the raised portion 161. If the clamping device in which the first clamping means and the second clamping means include the suppressing means against the occurrence of warpage is applied as it is for clamping of the article to be heat treated 10 shown in FIG. 2, there exists a problem that the movement of the flange portion is blocked because the width of the raised portion 11 of the article to be heat treated 10 in the Y direction tapers off toward the one side in the X direction toward which the flange portion 13 tends to move due to thermal expansion by the heating.

When the article to be heat treated 10 shown in FIG. 2 is clamped by the clamping device in which the first clamping means and the second clamping means have the above-described suppressing means against the occurrence of warpage, the problem as described above can be solved by replacing the position of the first clamping means and the second clamping means in this clamping device in reverse of the position of the first clamping means 22 and the second clamping means 23 in the clamping device 20 shown in FIG. 3 and FIG. 4 in respect to the X direction. Accordingly, the above-described means suppressing the occurrence of warpage can be applied to the clamping device for clamping the article to be heat treated 10 in FIG. 2.

In addition, the suppressing means against the occurrence of warpage shown in FIGS. 24 and 25 can be applied to the clamping devices described in FIGS. 7 and 8, the clamping devices described in FIGS. 9 to 11, the clamping device described in FIG. 12, the clamping devices described in FIGS. 13 to 17, the clamping devices described in FIGS. 18 and 19, the clamping devices described in FIGS. 20 and 21, and the clamping device described in FIG. 22 respectively.

Furthermore, the order of clamping the article to be heat treated by the respective clamping means as described in FIG. 12 can be applied to the clamping devices described in FIGS. 3 to 6, the clamping devices described in FIGS. 7 and 8, the clamping devices described in FIGS. 9 to 11, the clamping devices described in FIGS. 13 to 17, the clamping devices described in FIGS. 18 and 19, the clamping devices described in FIGS. 20 and 21, the clamping device described in FIG. 22, and the clamping devices described in FIGS. 24 and 25 respectively.

INDUSTRIAL AVAILABILITY

The present invention can be utilized for clamping an article to be heat treated when performing a heat treatment to the elongated-shaped article to be heat treated, such as a reinforcing member for a center pillar of a four-wheeled vehicle, in which the heat-treated regions and non-hardening regions are defined to extend in the longitudinal direction thereof as well as the heat-treated regions and the non-hardening regions are provided side by side in the width direction.

The invention claimed is:

1. A clamping device for clamping an elongated-shaped article to be heat-treated in a fixed position, the elongated article being made of a sheet material having a three-dimensional shape in which a raised portion raised in a direction orthogonal to the longitudinal direction and the width direction of the article, as well as extending in the longitudinal direction, and comprising two flange portions extending outwardly in the width direction from a raised portion base ends on both sides across the width of the article in the raised portion, in which at least one portion of said raised portion is said heat-treated region, at least one heat-treated region of the article to be heat-treated by quenching after heating and at least one non heat-treated region of the article not to be heat-treated both extend in the longitudinal direction of the article, the heat-treated region and the non heat-treated region being provided side-by-side in a width direction of the article orthogonal to the longitudinal direction, the article being clamped at a non heat-treated region during heat treatment, the clamping device comprising:

a plurality of clamping means arranged along the longitudinal direction of the article at each of the two flange portions, which are non heat-treated regions, at least one of the plurality of clamping means including a loose clamping means provided nearest to an end of the article in the longitudinal direction among said plurality of clamping means, said plurality of clamping means applying a load for allowing said article to be heat treated to be convex on one side in the direction orthogonal to the longitudinal direction and the width direction to said non heat-treated region, said plurality of clamping means comprising a first clamping means and a second clamping means arranged in the longitudinal direction of said article to be heat treated, wherein the number of said first clamping means is one for the longitudinal direction of said article to be heat treated, and said first clamping means is a tight clamping means holding fixedly a non heat-treated region, whereas the number of said second clamping means arranged apart from said first clamping means along the longitudinal direction is plural in the longitudinal direction of said article to be heat treated, and said clamping means are loose clamping means and automatic clamping means controlled by a control device, wherein an order for clamping said article to be heat treated by these second clamping means is controlled by said control device, and the order of clamping is in an order from near said first clamping means, and wherein said quenching for said heat treatment operation is performed from the other side in the direction orthogonal to the longitudinal direction and the width direction.

2. The clamping device for the article to be heat treated according to claim 1, wherein said first clamping means is an automatic clamping means controlled by a control device, and an order for clamping said article to be heat treated by said first clamping means is controlled by said control device, and the order for clamping is earlier than all said second clamping means.

3. The clamping device for the article to be heat treated according to claim 1, wherein the side to which said quenching is performed is one side out of inside and outside of said raised portion, and said plural clamping means apply a load for pressing and displacing said raised portion base ends on both sides across the width in said raised portion to said raised portion, to said article to be heat treated.

4. In a clamping device for clamping an elongated-shaped article to be heat-treated in a fixed position, in which at least one heat-treated region of the article to be heat-treated by quenching after heating and at least one non heat-treated region of the article not to be heat-treated both extend in a longitudinal direction of the article, the heat-treated region and the non heat-treated region are provided side-by-side in a width direction of the article orthogonal to the longitudinal direction, and the article being clamped at a non heat-treated region during heat treatment, the improvement comprising the clamping device comprising:

a plurality of clamping means arranged along the longitudinal direction of the article, at least one of the plurality of clamping means including a loose clamping means provided nearest to an end of the article in the longitudinal direction among said plurality of clamping means and at least one of the plurality of clamping means being constituted by an upper clamping member and a lower clamping member arranged vertically to face each other, at least one member of the upper clamping member and the lower clamping member being arranged on a raising and lowering member for raising and lowering the at least one member, wherein said lower clamping member is arranged on said raising and lowering member, said article to be heat treated is placed on said lower clamping means, and said article to be heat treated is clamped by said upper clamping member and said lower clamping member with said lower clamping member raised by said raising and lowering member.

5. The clamping device for the article to be heat treated according to claim 4, wherein the placement of said article to be heat treated on said lower clamping means is performed while said lower clamping means is on the way of being raised by said raising and lowering member.

6. The clamping device for the article to be heat treated according to claim 5, wherein a rail for guiding a traveling body on which said article to be heat treated is placed is installed at the middle of the height position where said lower clamping member is raised by said raising and lowering member, and said article to be heat treated is transferred from said traveling body to said lower clamping member while said lower clamping member is on the way of being raised by said raising and lowering member.

7. The clamping device for the article to be heat treated according to claim 4, wherein the placement of said article to be heat treated on said lower clamping means is performed before the lower clamping member begins to be raised by said raising and lowering member.

8. The clamping device for the article to be heat treated according to claim 7, wherein said raising and lowering member is arranged on a traveling body traveling just below said upper clamping member.

9. A method of clamping an article to be heat treated, made of a sheet material and having an elongated shape, constituted such that at least one heat-treated region to be heat treated by quenching after heating and at least one non heat-treated region not to be heat treated are both defined to extend in a longitudinal direction, and said heat-treated region and said non heat-treated region are provided side by side in a width direction orthogonal to the longitudinal direction, having a three-dimensional shape in which a raised portion is provided in the width direction orthogonal to the longitudinal direction, raised in the direction orthogonal to the longitudinal direction and the width direction as well as extending in the longitudinal direction, and including two flange portions extending outward in the width direction from raised portion base ends on both sides across the width in said raised portion, in which at least one portion of said raised portion is said heat-treated region, said method of clamping an article to be heat treated comprising:

a first step of clamping said article to be heat treated by said first clamping means as being a tight clamping means holding fixedly said non heat-treated region between a first clamping means and a second clamping means arranged in plural in the longitudinal direction;

a second step of clamping said article to be heat treated by said plural second clamping means as being loose clamping means allowing said article to be heat treated to be convex on the side of said heat-treated region, in which an order for the clamping is in an order from near said first clamping means;

a third step of heating said heat-treated region; and a fourth step of performing a quenching to said article to be heat treated curved to be convex on one side in the direction orthogonal to the longitudinal direction and the width direction by a load given from said first clamping means and said plural second clamping means, quenching from the other side.

10. In a clamping device for clamping an elongated-shaped article to be heat-treated in a fixed position, in which at least one heat-treated region of the article to be heat-treated by quenching after heating and at least one non heat-treated region of the article not to be heat-treated both extend in a longitudinal direction of the article, the heat-treated region and the non heat-treated region are provided side-by-side in a width direction of the article orthogonal to the longitudinal direction, and the article being clamped at a non heat-treated region during heat treatment, the improvement comprising the clamping device comprising:

a plurality of clamping means arranged along the longitudinal direction of the article, at least one of the plurality of clamping means including a loose clamping means provided nearest to an end of the article in the longitudinal direction among said plurality of clamping means and at least one of the plurality of clamping means being constituted by an upper clamping member and a lower clamping member arranged vertically to face each other, at least one member of the upper clamping member and the lower clamping member being arranged on a raising and lowering member for raising and lowering the at least one member, wherein said lower clamping member is arranged on said raising and lowering member, and said upper clamping member is arranged on an immovable member to which a heating device for heating said heat-treated region of said article to be heat treated is installed.

11. In a clamping device for clamping an elongated-shaped article to be heat-treated in a fixed position, in which at least one heat-treated region of the article to be heat-treated by quenching after heating and at least one non heat-treated region of the article not to be heat-treated both extend in a longitudinal direction of the article, the heat-treated region and the non heat-treated region are provided side-by-side in a width direction of the article orthogonal to the longitudinal direction, and the article being clamped at a non heat-treated region during heat treatment, the improvement comprising the clamping device comprising:

a plurality of clamping means arranged along the longitudinal direction of the article, at least one of the plurality of clamping means including a loose clamping means provided nearest to an end of the article in the longitudinal direction among said plurality of clamping means, said loose clamping means comprising a movement smoothing means for smoothing the movement of said non heat-treated region of the article in the longitudinal direction and allowing the article to be complex on the side of said heat-treated region, wherein each of said plurality of clamping means is constituted by including an upper clamping member and a lower clamping member arranged to face each other vertically and said upper clamping member and said lower clamping member are disposed on a work table to which said lower clamping member are disposed on a work table to which said article to be heat treated is set.

* * * * *

UNITED STATES PATENT AND TRADEMARK OFFICE
CERTIFICATE OF CORRECTION

| | | |
|---|---|---|
| PATENT NO. | : 7,361,015 B2 | Page 1 of 1 |
| APPLICATION NO. | : 10/541331 | |
| DATED | : April 22, 2008 | |
| INVENTOR(S) | : Satoshi Shimizu et al. | |

It is certified that error appears in the above-identified patent and that said Letters Patent is hereby corrected as shown below:

Column 28, line 50;  change "elongated-shaped article to be heat-treated"
                     to     --elongated-shaped article having a region to be heat-treated--

Column 28, line 53;  change "raised portion raised"
                     to     -- raised portion is raised--

Column 29, line 47;  change "said raised portion to said raised portion,"
                     to     --said raised portion to said one side out of inside and outside of said raised portion,--

Column 32, line 27;  change "to which said lower clamping member are disposed on a work table to which said article to be heat treated is set."
                     to     --to which said article to be heat-treated is set.--

Signed and Sealed this

Twenty-ninth Day of July, 2008

JON W. DUDAS
*Director of the United States Patent and Trademark Office*